(12) United States Patent
Yamada et al.

(10) Patent No.: US 11,165,292 B2
(45) Date of Patent: Nov. 2, 2021

(54) MOTOR

(71) Applicant: Denso Corporation, Kariya (JP)

(72) Inventors: Yoji Yamada, Hamamatsu (JP); Koji Mikami, Kosai (JP); Takahiro Tsuchiya, Toyohashi (JP); Hironari Suzuki, Kosai (JP); Seiya Yokoyama, Toyohashi (JP)

(73) Assignee: Denso Corporation

(*) Notice: Subject to any disclaimer, the term of this patent is extended or adjusted under 35 U.S.C. 154(b) by 74 days.

(21) Appl. No.: 16/800,022

(22) Filed: Feb. 25, 2020

(65) Prior Publication Data

US 2020/0195066 A1 Jun. 18, 2020

Related U.S. Application Data

(62) Division of application No. 15/620,578, filed on Jun. 12, 2017, now Pat. No. 10,622,852, which is a (Continued)

(30) Foreign Application Priority Data

Apr. 15, 2014 (JP) ................................ 2014-083713
Oct. 1, 2014 (JP) ................................ 2014-203193
Oct. 20, 2014 (JP) ................................ 2014-213674

(51) Int. Cl.
*H02K 1/24* (2006.01)
*H02K 21/16* (2006.01)
(Continued)

(52) U.S. Cl.
CPC ........... *H02K 1/243* (2013.01); *H02K 1/2713* (2013.01); *H02K 1/2746* (2013.01); *H02K 21/16* (2013.01); *H02K 19/103* (2013.01)

(58) Field of Classification Search
CPC ............ H02K 1/00; H02K 1/24; H02K 1/243; H02K 1/27; H02K 1/274; H02K 1/2746; H02K 1/271; H02K 1/2713; H02K 21/16
See application file for complete search history.

(56) References Cited

U.S. PATENT DOCUMENTS 3,303,369 A 2/1967 Erickson
3,553,511 A * 1/1971 Hemmings .......... H02K 1/2713
310/156.69
(Continued)

FOREIGN PATENT DOCUMENTS

CN 102290947 A 12/2011
CN 102971943 A 3/2013
(Continued)

OTHER PUBLICATIONS

Application and File history for U.S. Appl. No. 15/620,578, filed Jun. 12, 2017. Inventors: Yamada et al.
(Continued)

*Primary Examiner* — Tran N Nguyen
(74) *Attorney, Agent, or Firm* — Patterson Thuente Pedersen, P.A.

(57) ABSTRACT

A motor includes a stator, a rotor, a case, and back-surface magnet portions. The rotor has a first rotor core, a second rotor core and a field magnet. Each of the first and second rotor cores has a core base and claw-shaped magnetic poles. The field magnet is sandwiched between the first rotor core and the second rotor core and causes the claw-shaped magnetic poles of the first rotor core and the second rotor core to function as different magnetic poles. The back-surface magnet portions include a second and a first back-surface magnet portions respectively provided on the back surfaces of the claw-shaped magnetic poles of the second rotor core and the first rotor core. Size of the second
(Continued)

back-surface magnet portion differs from size of the first back-surface magnet portion are different from each other.

7 Claims, 17 Drawing Sheets

Related U.S. Application Data division of application No. 14/685,157, filed on Apr. 13, 2015, now Pat. No. 9,705,365.

(51) Int. Cl.
*H02K 1/27* (2006.01)
*H02K 19/10* (2006.01)

(56) References Cited

U.S. PATENT DOCUMENTS

| | | | |
|---|---|---|---|
| 3,849,682 A * | 11/1974 | Binns | H02K 1/2713 310/156.69 |
| 4,528,473 A | 7/1985 | Tezuka | |
| 4,882,515 A | 11/1989 | Radomski | |
| 4,920,292 A | 4/1990 | Albrecht et al. | |
| 5,502,424 A | 3/1996 | Kato | |
| 6,057,622 A | 5/2000 | Hsu | |
| 6,229,239 B1 * | 5/2001 | Lucidarme | H02K 21/046 310/162 |
| 6,538,358 B1 | 3/2003 | Krefta et al. | |
| 6,720,703 B1 | 4/2004 | Braun et al. | |
| 9,705,365 B2 | 7/2017 | Yamada et al. | |
| 10,270,306 B2 | 4/2019 | Yamada et al. | |
| 2005/0118044 A1 | 6/2005 | Inoue et al. | |
| 2005/0206254 A1 | 9/2005 | Tsuge et al. | |
| 2010/0019588 A1 | 1/2010 | Makino et al. | |
| 2011/0309707 A1 | 12/2011 | Kato et al. | |
| 2013/0026888 A1 | 1/2013 | Migita et al. | |
| 2013/0106208 A1 | 5/2013 | Yamada et al. | |
| 2013/0207502 A1 | 8/2013 | Yamada et al. | |
| 2013/0300242 A1 | 11/2013 | Yamada et al. | |
| 2013/0313938 A1 | 11/2013 | Yamada et al. | |
| 2014/0252904 A1 | 9/2014 | Mikami et al. | |
| 2015/0333580 A1 | 11/2015 | Yamada | |
| 2017/0033623 A1 | 2/2017 | Yokoyama et al. | |
| 2017/0033650 A1 | 2/2017 | Mikami et al. | |
| 2017/0279319 A1 | 9/2017 | Yamada et al. | |

FOREIGN PATENT DOCUMENTS

| | | |
|---|---|---|
| CN | 103095014 A | 5/2013 |
| CN | 103259353 A | 8/2013 |
| CN | 103326527 A | 9/2013 |
| JP | S5651449 U | 5/1981 |
| JP | S59135087 U | 9/1984 |
| JP | S60-138341 | 9/1985 |
| JP | 5-43749 U | 6/1993 |
| JP | H1189163 A | 3/1999 |
| JP | 2001141097 A | 5/2001 |
| JP | 2010263697 A | 11/2010 |
| JP | 2011120419 A | 6/2011 |
| JP | 2012-115085 A | 6/2012 |
| JP | 2013099097 A | 5/2013 |
| JP | 2013099105 A | 5/2013 |
| JP | 2013/169071 A | 8/2013 |
| JP | 2013226024 A | 10/2013 |
| WO | WO-2012067223 A1 | 5/2012 |

OTHER PUBLICATIONS

Application and File history for U.S. Appl. No. 14/685,157, filed Apr. 13, 2015. Inventors: Yamada et al.
Office Action dated Mar. 27, 2018 for Japanese Application No. 2014-203193, (3 pages) and English Language Machine Translation (3 pages) (6 pages total).
Application and File history for U.S. Appl. No. 14/603,879, filed Jan. 23, 2015, 2012. Inventors: Yamada et al.
Office Action for Chinese Application No. 201510041653.9, dated Mar. 28, 2018, 11 pages.
Office Action dated Sep. 14, 2017 for Japanese Application No. 2014-014292, 6 pages. (Including English Language Machine Translation).
Office Action dated Sep. 15, 2017 for Japanese Application No. 2014-025479, 7 pages. (Including English Language Machine Translation).
Office Action dated Oct. 17, 2017 for Japanese Application No. 2014-097744, 6 pages. (Including English Language Machine Translation).

* cited by examiner

MOTOR

RELATED APPLICATIONS

This application is a division of application Ser. No. 15/620,578 filed Jun. 12, 2017, which is a division of application Ser. No. 14/685,157 filed Apr. 13, 2015, now U.S. Pat. No. 9,705,365 issued Jul. 11, 2017, which claims priority to Japanese Patent Application No. 2014-083713 filed Apr. 15, 2014, Japanese Patent Application No. 2014-203193 filed Oct. 1, 2014, and Japanese Patent Application No. 2014-213674 filed Oct. 20, 2014, each of which is hereby fully incorporated herein by reference.

FIELD OF THE INVENTION

The present invention relates to a motor accommodating a stator and a rotor in a case.

BACKGROUND OF THE INVENTION

Conventionally, as a rotor used in a motor, a rotor having a Lundell structure with a so-called permanent magnet field disclosed in Japanese Patent Laid-Open Publication No. 2012-115085 and Japanese Utility Model Laid-Open Publication No. 5-43749 is known. Such a rotor includes two rotor cores combined with each other and a field magnet arranged between the two rotor cores. Each of the rotor cores has a plurality of claw-shaped magnetic poles aligned in a peripheral direction. The field magnet causes the claw-shaped magnetic poles to function as alternately different magnetic poles.

Moreover, in the rotor disclosed in Japanese Patent Laid-Open Publication No. 2012-115085, in order to increase an output of the motor, a back-surface magnet for rectifying a magnetic path is arranged on a back surface of the claw-shaped magnetic pole. Moreover, in this rotor, in order to increase the output of the motor, an inter-pole magnet for rectifying the magnetic path is arranged between the alternately arranged claw-shaped magnetic poles. Such a motor is accommodated in a case having a yoke housing having a cylindrical shape with a bottom and an end frame provided on one end of the yoke housing.

In the motor as above, the yoke housing which is a magnetic body is located on one end surface side in an axial direction of the rotor, and the end frame made of a resin is located on the other end surface side in the axial direction of the rotor. In this case, a part of a magnetic flux from the field magnet of the rotor leaks to the case (yoke housing), and there is a concern that a magnetic flux amount (magnetic balance) is unbalanced between the N-pole and the S-pole. Moreover, in this case, detent torque becomes unbalanced, and there is a concern that it causes deterioration of sound and vibration. Furthermore, in this case, a part of the magnetic flux from the field magnet of the rotor leaks to the case (yoke housing) and there is a concern that it causes deterioration of output characteristics.

SUMMARY OF THE INVENTION

A first object of the present invention is to provide a motor which can make magnetic balance favorable by adjusting a leakage flux. A second object is to provide a motor which can make a balance of detent torque favorable. A third object is to provide a motor which can suppress the leakage flux and improve the output characteristics.

To achieve the above object, first aspect of the present invention is a motor including a stator, a rotor, a case, and a plurality of back-surface magnet portions. The stator has a stator core and a winding. The rotor has a first rotor core, a second rotor core, and a field magnet. Each of the first and second rotor cores has a substantially disc-shaped core base and a plurality of claw-shaped magnetic poles provided on an outer peripheral portion of the core base along a peripheral direction. The field magnet is sandwiched between the first rotor core and the second rotor core in an axial direction. The field magnet is configured such that the claw-shaped magnetic pole of the first rotor core and the claw-shaped magnetic pole of the second rotor core function as magnetic poles different from each other in a sandwiched state. The case is cylindrical with a bottom. The case has a yoke housing which is a magnetic body and a lid portion closing an opening portion of the yoke housing. The yoke housing accommodates the stator and the rotor. The plurality of back-surface magnet portions is arranged in a gap formed on a back surface of the claw-shaped magnetic pole. The plurality of back-surface magnet portions include a second back-surface magnet portion provided on the back surface of the claw-shaped magnetic pole of the second rotor core and a first back-surface magnet portion provided on the back surface of the claw-shaped magnetic pole of the first rotor core. A size of the second back-surface magnet portion and a size of the first back-surface magnet portion are different from each other.

A second aspect of the present invention is a motor including a stator, a rotor, and a case. The stator has a stator core and a winding. The rotor has a first rotor core made of metal, a second rotor core made of metal, and a field magnet. Each of the first and second rotor cores having a plurality of claw-shaped magnetic poles arranged in a peripheral direction. The field magnet is sandwiched between the first rotor core and the second rotor core in an axial direction. The field magnet is configured so as to cause the claw-shaped magnetic pole of the first rotor core and the claw-shaped magnetic pole of the second rotor core to function as magnetic poles different from each other in the sandwiched state. The case is cylindrical with a bottom. The case has a yoke housing which is a magnetic body and a lid portion closing an opening portion of the yoke housing. The yoke housing accommodates the stator and the rotor. In the axial direction, the first rotor core is located closer to the lid portion than the second rotor core. The second rotor core is located closer to a bottom portion of the yoke housing than the first rotor core. The second rotor core is configured so as to be magnetically saturated less easily than the first rotor core.

A third aspect of the present invention is a motor including a stator, a rotor, and a case. The stator has a stator core having a plurality of teeth and a winding wound around the plurality of teeth. Each of the teeth extends in a radial direction. The rotor has a first rotor core, a second rotor core, and a field magnet. Each of the first and second rotor cores has a substantially disc-shaped core base and a plurality of claw-shaped magnetic poles provided at equal intervals on an outer peripheral portion of the core base. Each of the claw-shaped magnetic poles protrudes outside in a radial direction and extends in an axial direction. The core bases are opposed to each other and their claw-shaped magnetic poles are alternately arranged in the peripheral direction. The field magnet is arranged in the axial direction between the core bases. The field magnet is magnetized in the axial direction so as to cause the claw-shaped magnetic pole of the first rotor core to function as a first magnetic pole and the claw-shaped magnetic pole of the second rotor core to function as a second magnetic pole. The case is cylindrical with a bottom. The case has a yoke housing which is a magnetic body and a lid portion closing an opening portion of the yoke housing. The case accommodates the stator and the rotor. The yoke housing has a bottom portion. The bottom portion is configured such that a part of the bottom portion has a sectional area different from the sectional area of the other portions in a section along the axial direction.

DETAILED DESCRIPTION OF THE PREFERRED EMBODIMENTS

First Embodiment

A first embodiment of a motor will be described below.

Figure 1:
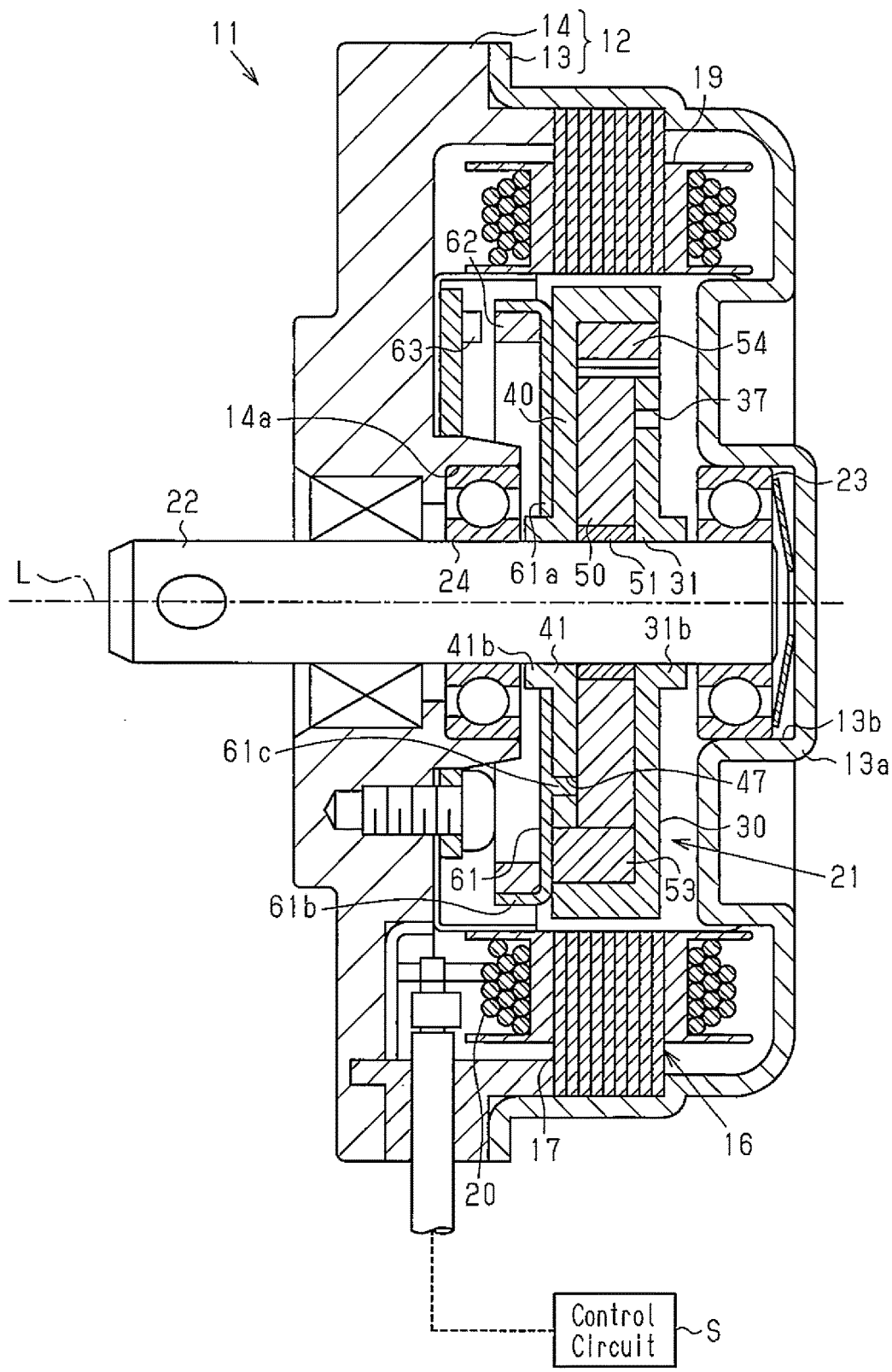
FIG. 1 is a sectional view of a motor according to a first embodiment of the present invention.

As illustrated in FIG. 1, a case 12 of a brushless motor 11 serving as a motor has a yoke housing 13 formed having a substantially cylindrical shape with a bottom and an end plate 14 serving as a lid portion for closing an opening of a front side (left side in FIG. 1) of this yoke housing 13. The yoke housing 13 is constituted by a magnetic body (iron, for example), for example. The end plate 14 is constituted by a non-magnetic body (a resin material, for example), for example.

As illustrated in FIG. 1, a stator 16 is fixed to an inner peripheral surface of the yoke housing 13. The stator 16 is provided with a stator core 17 having a plurality of teeth 17a extending to an inside in the radial direction and a winding 20 wound around the teeth 17a of the stator core 17 through an insulator 19. The stator 16 generates a rotating magnetic field when a driving current is supplied to the winding 20 from an external control circuit S.

Figure 2:
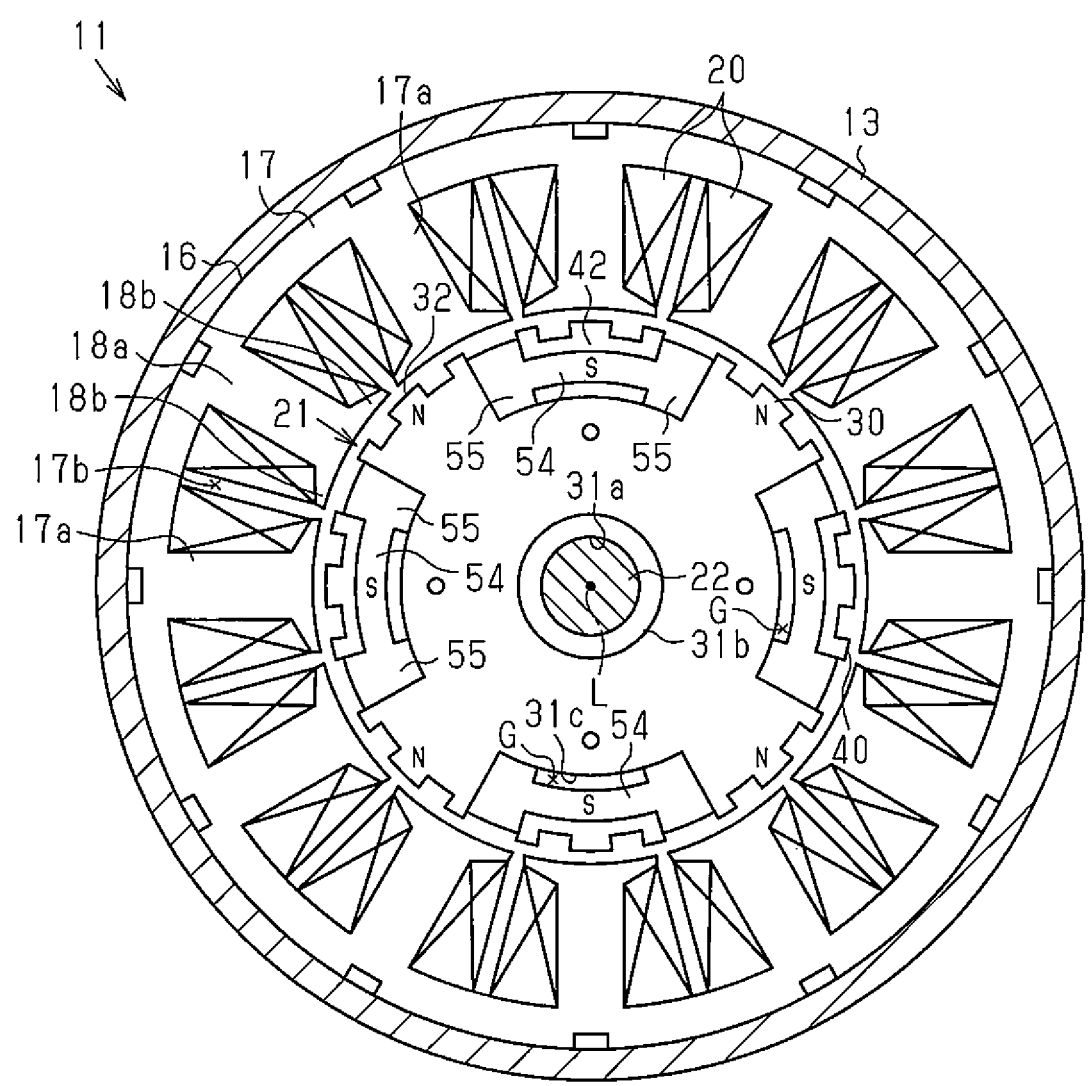
FIG. 2 is a plane view of the motor in FIG. 1.

As illustrated in FIG. 2, the stator core 17 has twelve teeth 17a. Therefore, the number of slots 17b formed between the teeth 17a is also twelve.

As illustrated in FIG. 2, each of the teeth 17a is provided with a winding portion 18a and a protruding portion 18b protruding to both sides in a peripheral direction from an end portion inside in the radial direction of the winding portion 18a. In the winding portion 18a, U-phase, V-phase, and W-phase windings 20 are wound in a concentrated winding.

As illustrated in FIG. 1, a rotor 21 of the brushless motor 11 has a rotating shaft 22 and is arranged inside the stator 16. The rotating shaft 22 is a non-magnetic body metal shaft and is supported rotatably by bearings 23 and 24 supported by a bearing holding portion 13b of a bottom portion 13a of the yoke housing 13 and a bearing holding portion 14a of an end plate 14.

Figure 3:
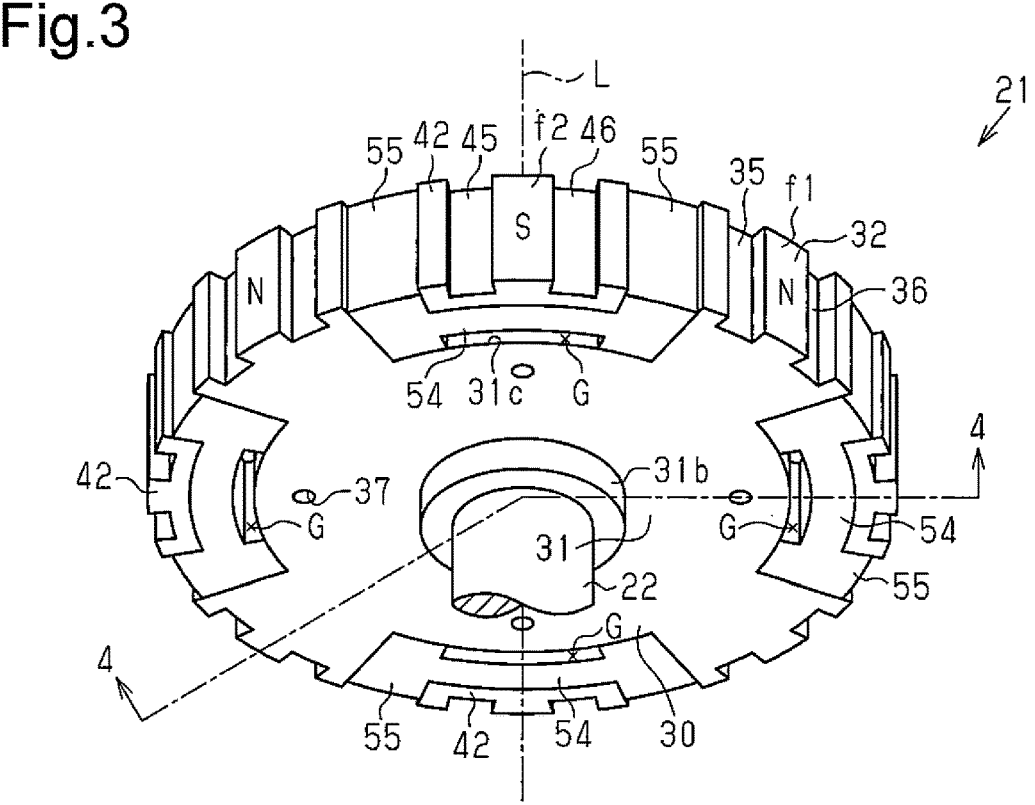
FIG. 3 is a perspective view of a rotor in FIG. 2.
Figure 4:
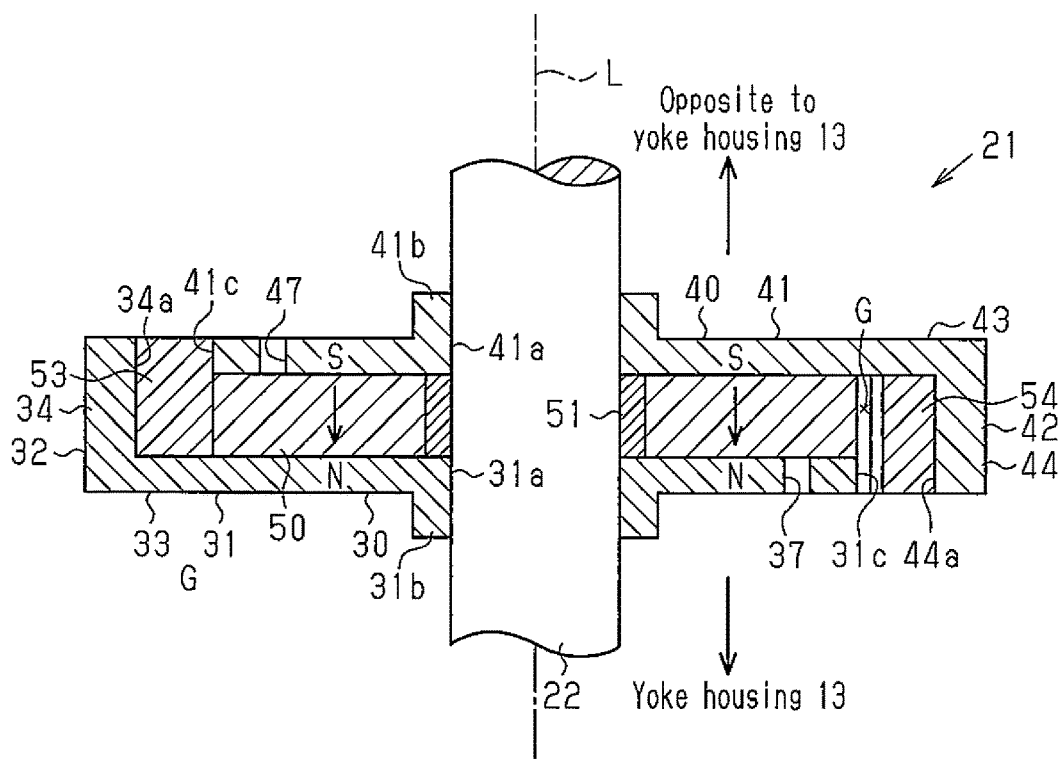
FIG. 4 is a sectional view along line 4-4 in FIG. 3.
Figure 5:
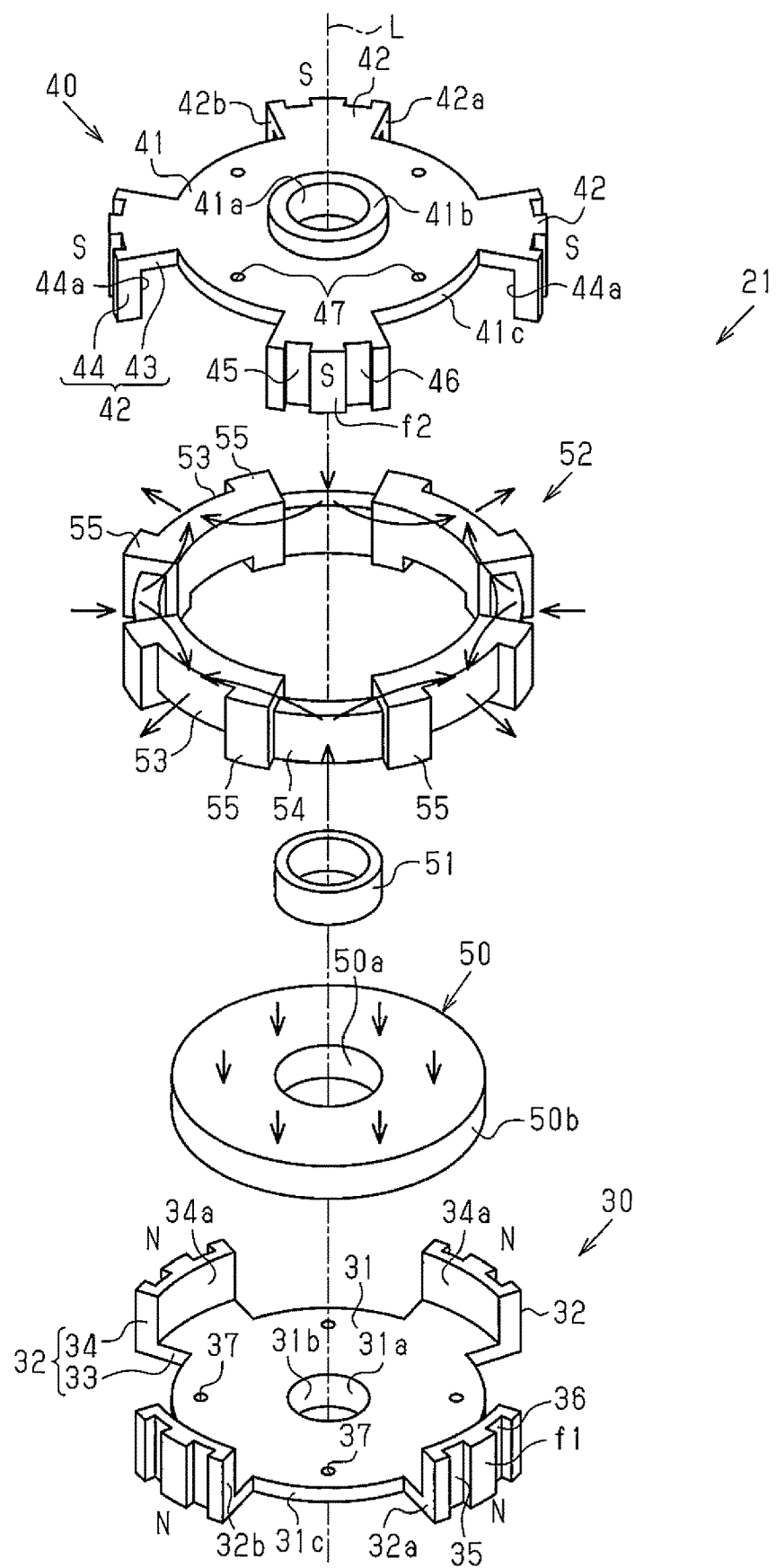
FIG. 5 is an exploded perspective view of the rotor in FIG. 3.

As illustrated in FIGS. 3 to 5, the rotor 21 includes first and second rotor cores 30 and 40, an annular magnet 50 serving as a field magnet interposed between each of the rotor cores 30 and 40 in the axial direction (direction along an axis L), and a rectification magnet 52. The first and second rotor cores 30 and 40 are fixed to the rotating shaft 22 while an axial interval defined therebetween is held by press-fit of the rotating shaft 22.

As illustrated in FIGS. 3 to 5, the first rotor core 30 has a substantially disc-shaped core base 31, and a through hole 31a is formed at a substantially center position thereof. From an outer peripheral portion on one side in the axial direction of the through hole 31a, a substantially cylindrical boss portion 31b is protruded. In the first embodiment, the through hole 31a and the boss portion 31b are formed at the same time by burring work. An outer diameter of the boss portion 31b is smaller than an outer diameter of the bearing 23 rotatably supporting one side of the rotating shaft 22, that is, an inner diameter of the bearing holding portion 13b for accommodating and fixing the bearing 23 provided on the yoke housing 13.

As illustrated in FIG. 1, the rotating shaft 22 is press-fitted into the through hole 31a (boss portion 31b), and the core base 31 is pressed and fixed to the rotating shaft 22. At this time, by means of formation of the boss portion 31b, the core base 31 is firmly pressed and fixed to the rotating shaft 22. When the core base 31 is pressed and fixed to the rotating shaft 22, the boss portion 31b is spaced away in the axial direction from the bearing 23 accommodated in and fixed to the bearing holding portion 13b.

On an outer peripheral surface 31c of the core base 31 of the first rotor core 30, a plurality of (four in the first embodiment) claw-shaped magnetic poles 32 are formed at equal intervals. Each of the claw-shaped magnetic poles 32 protrudes to an outside in the radial direction and also extends in the axial direction. In more detail, the claw-shaped magnetic pole 32 has a protruding portion 33 protruding to the outside in the radial direction from the outer peripheral portion of the core base 31 and a claw portion 34 provided at a tip end of the protruding portion 33 and extending in the axial direction.

Both end surfaces 32a and 32b in the peripheral direction of the claw-shaped magnetic pole 32 are flat surfaces extending in the radial direction (not inclined with respect to the radial direction when seen from the axial direction). An angle of each of the claw-shaped magnetic poles 32 in the peripheral direction, that is, an angle between the both end surfaces 32a and 32b in the peripheral direction is set smaller than an angle of a gap between the claw-shaped magnetic poles adjacent to each other in the peripheral direction.

Moreover, an outer surface f1 in the radial direction of the claw portion 34 has an arc-shaped section around the axis L of the rotating shaft 22 in a direction orthogonal to the axis L. The outer surface f1 in the radial direction has two grooves, that is, a first auxiliary groove 35 and a second auxiliary groove 36. The first auxiliary groove 35 and the second auxiliary groove 36 are formed at respective positions shifted in the peripheral direction only by the same angle to both sides from the center in the peripheral direction of the outer surface f1. Each of the first auxiliary groove 35 and the second auxiliary groove 36 has a substantially U-shaped section in the direction orthogonal to the axis L.

Moreover, in the core base 31 of the first rotor core 30, four attachment holes 37 are provided at equal angular intervals on a circle around the axis L. Each of the attachment holes 37 penetrates the core base 31.

As illustrated in FIGS. 3 to 5, the second rotor core 40 is constituted to have the same material and shape as those of the first rotor core 30.

The second rotor core 40 has a substantially disc-shaped core base 41, and a through hole 41a is formed at a substantially center position of the core base 41. From an outer peripheral portion on the other side in the axial direction of the through hole 41a, a substantially cylindrical boss portion 41b is protruded. In the first embodiment, the through hole 41a and the boss portion 41b are formed at the same time by burring work. An outer diameter of the boss portion 41b is smaller than an outer diameter of the bearing 24 rotatably supporting one side of the rotating shaft 22, that is, an inner diameter of the bearing holding portion 14a for accommodating and fixing the bearing 24 provided on the end plate 14.

The rotating shaft 22 is press-fitted into the through hole 41a (boss portion 41b), and the core base 41 is pressed and fixed to the rotating shaft 22. At this time, by means of formation of the boss portion 41b, the core base 41 is firmly pressed and fixed to the rotating shaft 22. When the core base 41 is pressed and fixed to the rotating shaft 22, the boss portion 41b is spaced away in the axial direction from the bearing 24 accommodated in and fixed to the bearing holding portion 14b.

On an outer peripheral surface 41c of the core base 41 of the second rotor core 40, a plurality of (four in the first embodiment) claw-shaped magnetic poles 42 are formed at equal intervals. Each of the claw-shaped magnetic poles 42 protrudes to an outside in the radial direction and also extends in the axial direction. In more detail, the claw-shaped magnetic pole 42 has a protruding portion 43 protruding to the outside in the radial direction from the outer peripheral portion of the core base 41 and a claw portion 44 provided at a tip end of the protruding portion 43 and extending in the axial direction.

Both end surfaces 42a and 42b in the peripheral direction of the claw-shaped magnetic pole 42 are flat surfaces extending in the radial direction (not inclined with respect to the radial direction when seen from the axial direction). An angle of each of the claw-shaped magnetic poles 42 in the peripheral direction, that is, an angle between the both end surfaces 42a and 42b in the peripheral direction is set smaller than an angle of a gap between the claw-shaped magnetic poles adjacent to each other in the peripheral direction.

Moreover, an outer surface f2 in the radial direction of the claw portion 44 has an arc-shaped section around the axis L of the rotating shaft 22 in a direction orthogonal to the axis L. The outer surface f2 in the radial direction has two grooves, that is, a first auxiliary groove 45 and a second auxiliary groove 46. The first auxiliary groove 45 and the second auxiliary groove 46 are formed at respective positions shifted in the peripheral direction only by the same angle to both sides from the center in the peripheral direction of the outer surface f2. Each of the first auxiliary groove 45 and the second auxiliary groove 46 has a substantially U-shaped section in the direction orthogonal to the axis L.

Moreover, the core base 41 of the second rotor core 40 has four attachment holes 47 located at equal angular intervals on a circle around the axis L. Each of the attachment holes 47 penetrates the core base 41. Into this attachment hole 47, a projection 61c of a support plate 61 holding a sensor magnet 62 is inserted. The attachment hole 47 is provided in order to attach the support plate 61 to the rotor 21.

Then, the rotating shaft 22 is press-fitted into the through holes 31a and 41a of the rotor cores 30 and 40. The rotor cores 30 and 40 are fixed to the rotating shaft 22 so that a distance between the outer surfaces in the axial direction of the core bases 31 and 41 (distance between opposed side surfaces) becomes a distance set in advance. At this time, the second rotor core 40 is assembled to the rotor core 30 so that the annular magnet 50 is arranged (sandwiched) between the core base 41 and the core base 31 in the axial direction. At this time, each of the claw-shaped magnetic poles 42 is arranged between the claw-shaped magnetic poles 32 of the first rotor core 30 adjacent to each other in the peripheral direction.

Figure 6:
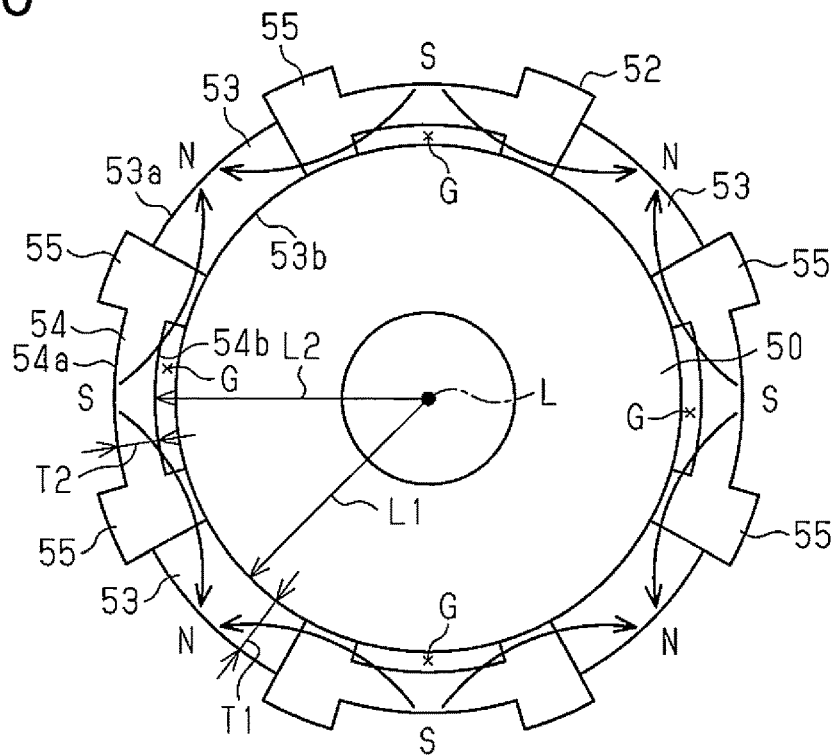
FIG. 6 is a plan view of a rectifying magnet and an annular magnet in FIG. 5.

As illustrated in FIGS. 4 to 6, the annular magnet 50 is a disc-shaped permanent magnet, and a through hole 50a is formed in a center part thereof. A cylindrical sleeve 51 is inserted into the through hole 50a of the annular magnet 50. The sleeve 51 is made of a non-magnetic body and is formed by stainless similarly to the rotating shaft 22 in the first embodiment. An outer peripheral surface of the sleeve 51 and an inner peripheral surface of the through hole 50a of the annular magnet 50 are bonded by an adhesive made of a hardening resin not permeable to a magnetic flux.

An outer diameter of the annular magnet 50 matches the outer diameters of the core base 31 of the first rotor core 30 and the core base 41 of the second rotor core 40. Therefore, an outer peripheral surface 50b of the annular magnet 50 becomes flush with the outer peripheral surface 31c of the core base 31 of the first rotor core 30 and the outer peripheral surface 41c of the core base 41 of the second rotor core 40.

The annular magnet 50 is magnetized in the axial direction so that the claw-shaped magnetic pole 32 of the first rotor core 30 functions as the N-pole, while the claw-shaped magnetic pole 42 of the second rotor core 40 functions as the S-pole. That is, the rotor 21 of the first embodiment is a rotor with a so-called Lundell structure using the annular magnet 50 as a field magnet. The rotor 21 is constituted such that the four claw-shaped magnetic poles 32 which are the N-poles and the four claw-shaped magnetic poles 42 which are the S-poles are arranged alternately in the peripheral direction. The number of poles of the rotor 21 is eight (the number of pole pairs is four). That is, the brushless motor 11 of the first embodiment is constituted such that the number of poles of the rotor 21 is "8" and the number of teeth 17a of the stator 16 is "12".

As illustrated in FIGS. 4 to 6, the rectification magnet 52 includes a first back-surface magnet portion 53, a second back-surface magnet portion 54, and an inter-pole magnet portion 55. The rectification magnet 52 is a polar anisotropic magnet magnetized so that each of the back-surface magnet portions 53 and 54 and the inter-pole magnet portion 55 suppresses leakage flux. The annular magnet 50 and the rectification magnet 52 are constituted by different materials. Specifically, the annular magnet 50 is an anisotropic sintered magnet, for example, and is constituted by a ferrite magnet, a samarium cobalt (SmCo) magnet, a neodymium magnet, an alnico (AlNiCo) magnet and the like, for example. The rectification magnet 52 is a bond magnet (plastic magnet, rubber magnet and the like), for example, and can be constituted by a ferrite magnet, a samarium-iron-nitrogen (SmFeN) magnet, a samarium cobalt (SmCo) magnet, a neodymium magnet, an alnico (AlNiCo) magnet and the like, for example.

The first back-surface magnet portion 53 is arranged between a back surface 34a of the claw-shaped magnetic pole 32 (claw portion 34) of the first rotor core 30 and the outer peripheral surface 41c of the core base 41 of the second rotor core 40. The back-surface magnet portion 53 is magnetized mainly in the radial direction component such that a portion in contact with the back surface 34a (inner peripheral surface) of the claw portion 34 becomes the S-pole which is the same pole as its claw portion 34 and a portion in contact with the outer peripheral surface 41c of the core base 41 of the second rotor core 40 becomes the N-pole which is the same pole as its core base 41.

The second back-surface magnet portion 54 is arranged between a back surface 44a of the claw-shaped magnetic pole 42 (claw portion 44) of the second rotor core 40 and an outer peripheral surface 31c of the core base 31 of the first rotor core 30. The back-surface magnet portion 54 is magnetized mainly in the radial direction component such that a portion in contact with the back surface 44a (inner peripheral surface) of the claw portion 44 becomes the N-pole which is the same pole as its claw portion 44 and a portion in contact with the outer peripheral surface 31c of the core base 31 of the first rotor core 30 becomes the S-pole which is the same pole as its core base 31.

As illustrated in FIG. 6, as a volume of the back-surface magnet portion 53 is different from a volume of the back-surface magnet portion 54, the back-surface magnet portion 53 has a thickness T1 in the radial direction larger than a thickness T2 in the radial direction of the back-surface magnet portion 54 (T1>T2). More specifically, an outer surface 53a in the radial direction of the back-surface magnet portion 53 and an outer surface 54a in the radial direction of the back-surface magnet portion 54 are located on a circle around a center in the radial direction (axis L) of the rectification magnet 52. Then, a distance L1 between an inner surface 53b in the radial direction of the back-surface magnet portion 53 and the center in the radial direction (axis L) is shorter than a distance L2 between an inner surface 54b in the radial direction of the back-surface magnet portion 54 and the center in the radial direction (axis L). Thus, when the annular magnet 50 is arranged inside in the radial direction of the rectification magnet 52, for example, a gap G is provided between the inner surface 54b in the radial direction of the back-surface magnet portion 54 and the outer peripheral surface 50b of the annular magnet 50. Moreover, since an outer diameter of the annular magnet 50 and an outer diameter of each of the core bases 31 and 41 are substantially the same, as illustrated in FIGS. 2 and 3, the gap G is provided also between the inner surface 54b in the radial direction of the back-surface magnet portion 54 and the outer peripheral surface 31c of the core base 31.

An inter-pole magnet portion 55 is arranged between the first claw-shaped magnetic pole 32 and the second claw-shaped magnetic pole 42 in the peripheral direction. The inter-pole magnet portion 55 is magnetized mainly in the peripheral direction component so that a portion closer to the first claw-shaped magnetic pole 32 in the peripheral direction is the N-pole and a portion closer to the second claw-shaped magnetic pole 42 is the S-pole.

As illustrated in FIG. 1, on an end surface closer to the end plate 14 of the rotor 21 (an end surface of the core base 41 of the second rotor core 40), the support plate 61 holding the sensor magnet 62 is fixed. The support plate 61 is formed of a non-magnetic body.

As illustrated in FIG. 1, the support plate 61 has a disc-shaped base portion 61a. At a center part of the base portion 61a, a through hole through which the rotating shaft 22 is penetrated is formed. A surface of the base portion 61a closer to the second rotor core 40 has four projections 61c (only one of them is shown in FIG. 1) arranged at equal angular intervals. The projections 61c are formed by pressing and protrude from the surface of the base portion 61a. The projections 61c are fitted in the attachment holes 47 formed in the core base 41 of the second rotor core 40, respectively. At this time, the base portion 61a is brought into contact with the end surface of the core base 41 of the second rotor core 40 in the axial direction and with a part of the rectification magnet 52 (end surface in the axial direction of the back-surface magnet portion 53 and the end surface in the axial direction of the inter-pole magnet portion 55) in the axial direction.

On an outer peripheral edge portion of the base portion 61a, a cylindrical wall 61b extending toward a side opposite to the rotor 21 in the axial direction (extending toward the end plate 14) is provided. An outer diameter of the cylindrical wall 61b is substantially equal to the outer diameter of the rotor 21.

As illustrated in FIG. 1, on an inner peripheral surface of the cylindrical wall 61b, the ring-shaped sensor magnet 62 is provided. An outer surface in the radial direction of the sensor magnet 62 is fixed to the inner peripheral surface of the cylindrical wall 61b by an adhesive. At this time, the sensor magnet 62 is fixed to the support plate 61 so that an axis of the sensor magnet 62 matches the axis L of the rotating shaft 22. As described above, the sensor magnet 62 is constituted capable of integral rotation with the rotor 21.

On the end plate 14, a magnetic sensor 63 such as a hall IC or the like faced with the sensor magnet 62 in the axial direction is provided. This magnetic sensor 63 outputs an H-level detection signal and an L-level detection signal to the control circuit S when it senses a magnetic field of the N-pole and a magnetic field of the S-pole of the sensor magnet 62, respectively.

Subsequently, an action of the brushless motor 11 constituted as above will be described.

When a three-phase driving current is supplied to the winding 20 from the control circuit S, a rotating magnetic field is generated in the stator 16, and the rotor 21 is rotated/driven. At this time, rotation of the sensor magnet 62 faced with the magnetic sensor 63 causes a level of the detection signal outputted from the magnetic sensor 63 to switch in accordance with a rotation angle (position) of the rotor 21, and the three-phase driving current switched at an optimal timing is supplied from the control circuit S to the winding 20 on the basis of the detection signal. As a result, the rotating magnetic field is favorably generated, and the rotor 21 is continuously rotated/driven favorably.

Here, the core base 31 of the first rotor core 30 is closer to the bottom portion 13a of the yoke housing 13 in the axial direction than the core base 41 of the second rotor core 40. As a result, a leakage flux can occur easily between the core base 31 of the first rotor core 30 and the yoke housing 13 (bottom portion 13a). In the first embodiment, the thickness T1 of the back-surface magnet portion 53 provided on the back surface of the claw-shaped magnetic pole 32 (claw portion 34) of the first rotor core 30 is larger than the thickness T2 of the back-surface magnet portion 54 provided on the back surface of the claw-shaped magnetic pole 42 (claw portion 44) of the second rotor core 40. Thus, a magnetic flux amount of the back-surface magnet portion 53 is larger than the magnetic flux amount of the back-surface magnet portion 54. As a result, even if a leakage flux occurs between the core base 31 of the first rotor core 30 and the bottom portion 13a, a magnetic balance can be made favorable.

Subsequently, advantages of the first embodiment will be described.

(1) The back-surface magnet portion 53 provided on the back surface of the claw-shaped magnetic pole 32 of the first rotor core 30 has a thickness larger than the thickness of the back-surface magnet portion 54 provided on the back surface of the claw-shaped magnetic pole 42 of the second rotor core 40. As a result, since the magnetic flux amount of the back-surface magnet portion 53 becomes relatively large, even if a leakage flux occurs, the magnetic balance can be made favorable.

(2) The back-surface magnet portions 53 and 54 are integrally formed with the inter-pole magnet portion 55. Thus, an increase in the number of components can be suppressed.

Second Embodiment

Subsequently, a second embodiment of a motor will be described.

The motor of the second embodiment is different from the first embodiment in a configuration of a rotor, and the stator has the same configuration. Thus, the rotor will be mainly described, and the same reference numerals are given to the other configurations, and a part of or the whole of the explanation will be omitted.

Figure 10:
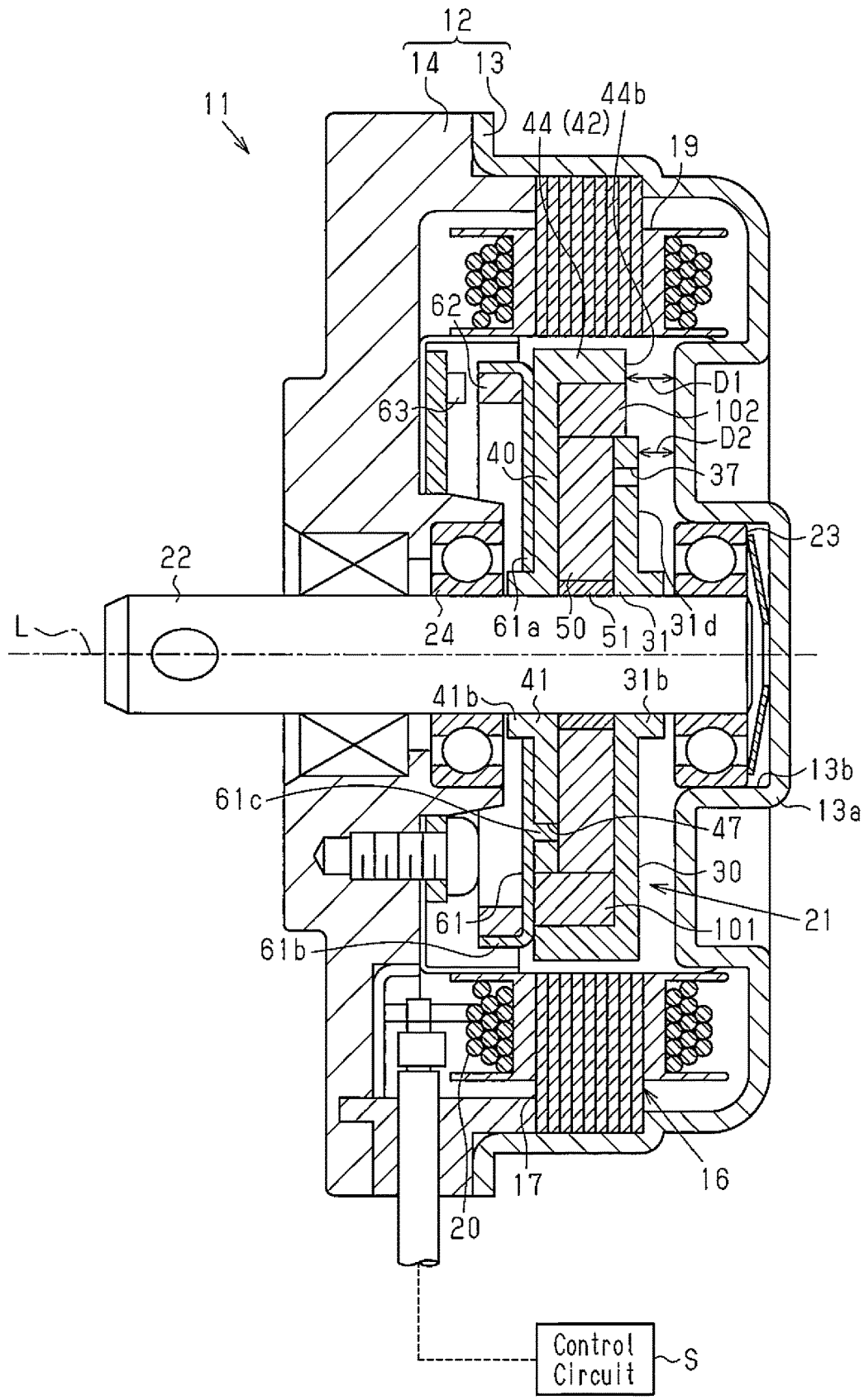
FIG. 10 is a sectional view of a motor according to a second embodiment of the present invention.
Figure 11:
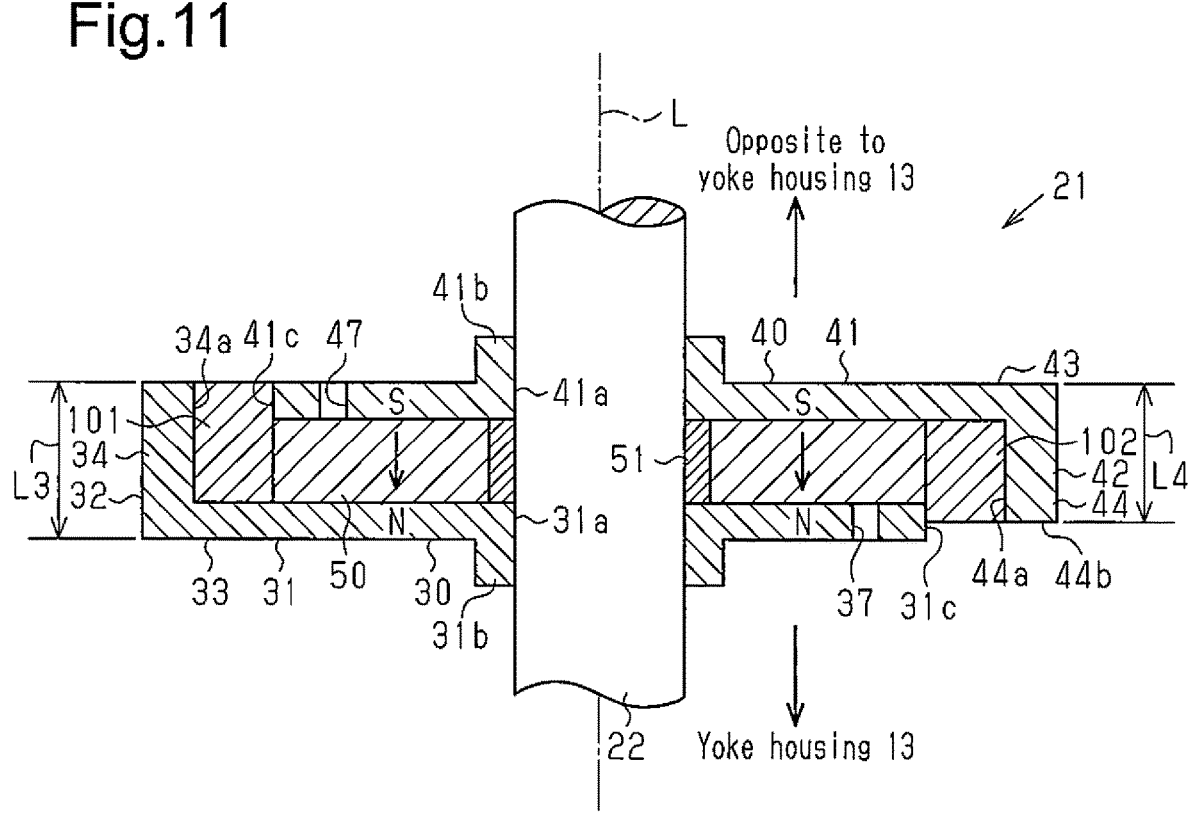
FIG. 11 is a sectional view of the rotor in FIG. 10.

As illustrated in FIGS. 10 and 11, the rotor 21 of the brushless motor 11 has the rotating shaft 22 and is arranged inside the stator 16. The rotating shaft 22 is a non-magnetic body metal shaft and is supported rotatably by the bearings 23 and 24 supported by the bearing holding portion 13b of the bottom portion 13a of the yoke housing 13 and the bearing holding portion 14a of the end plate 14.

As illustrated in FIG. 11, the rotor 21 includes the first and second rotor cores 30 and 40, the annular magnet 50 serving as a field magnet interposed between the rotor cores 30 and 40 in the axial direction, and the rectification magnet 100. The first and second rotor cores 30 and 40 are fixed to the rotating shaft 22 while an axial interval defined therebetween is held by press-fit of the rotating shaft 22.

On the outer peripheral surface 31c of the core base 31 of the first rotor core 30, a plurality of (four in the second embodiment) claw-shaped magnetic poles 32 are formed at equal intervals. Each of the claw-shaped magnetic poles 32 protrudes to an outside in the radial direction and also extends in the axial direction. In more detail, the claw-shaped magnetic pole 32 has the protruding portion 33 protruding to the outside in the radial direction from the outer peripheral portion of the core base 31 and the claw portion 34 provided at a tip end of the protruding portion 33 and extending in the axial direction.

On the outer peripheral surface 41c of the core base 41 of the second rotor core 40, a plurality of (four in the second embodiment) claw-shaped magnetic poles 42 are formed at equal intervals. Each of the claw-shaped magnetic poles 42 protrudes to an outside in the radial direction and also extends in the axial direction. In more detail, the claw-shaped magnetic pole 42 has the protruding portion 43 protruding to the outside in the radial direction from the outer peripheral portion of the core base 41 and the claw portion 44 provided at a tip end of the protruding portion 43 and extending in the axial direction.

Moreover, the claw-shaped magnetic pole 32 of the first rotor core 30 (claw portion 34) has an axial length L3 longer than an axial length L4 of the claw-shaped magnetic pole 42 of the second rotor core 40 (claw portion 44). Thus, in a state in which the core bases 31 and 41 of the rotor cores 30 and 40 and the annular magnet 50 are assembled, a tip end surface 44b of the claw-shaped magnetic pole 42 of the second rotor core 40 (claw portion 44) is located on a side opposite to the yoke housing 13 in the axial direction from an axial end surface 31d of the core base 31 of the first rotor core 30. That is, the tip end surface 44b is located at a position spaced away from the yoke housing 13 from the end surface 31d. As a result, a separation distance D1 in the axial direction between the tip end surface 44b of the claw-shaped magnetic pole 42 of the second rotor core 40 (claw portion 44) and the yoke housing 13 becomes longer than a separation distance D2 in the axial direction between the axial end surface 31d of the core base 31 of the first rotor core 30 and the yoke housing 13.

Then, the rotating shaft 22 is press-fitted into the through holes 31a and 41a of the rotor cores 30 and 40. The rotor cores 30 and 40 are press-fitted and fixed to the rotating shaft 22 so that an interval between the axial outer surfaces of the core bases 31 and 41 (distance between opposing side surfaces) becomes a distance set in advance. At this time, the second rotor core 40 is assembled to the rotor core 30 so that the annular magnet 50 is arranged (sandwiched) in the axial direction between the core base 41 and the core base 31. At this time, each of the claw-shaped magnetic poles 42 is arranged between the claw-shaped magnetic poles 32 adjacent to each other in the peripheral direction of the other first rotor core 30.

As illustrated in FIG. 11, the annular magnet 50 is a disc-shaped permanent magnet, and the through hole 50a is formed in the center part thereof. The cylindrical sleeve 51 is inserted into the through hole 50a of the annular magnet 50. The sleeve 51 is made of a non-magnetic body and is formed by stainless similarly to the rotating shaft 22 in the second embodiment. The outer peripheral surface of the sleeve 51 and the inner peripheral surface of the through hole 50a of the annular magnet 50 are fixed by an adhesive made of a hardening resin not permeable to a magnetic flux. The annular magnet 50 is magnetized in the axial direction so that the claw-shaped magnetic pole 32 of the first rotor core 30 functions as the N-pole, while the claw-shaped magnetic pole 42 of the second rotor core 40 functions as the S-pole. That is, the rotor 21 of the second embodiment is a rotor with a so-called Lundell structure using the annular magnet 50 as a field magnet.

Figure 12:
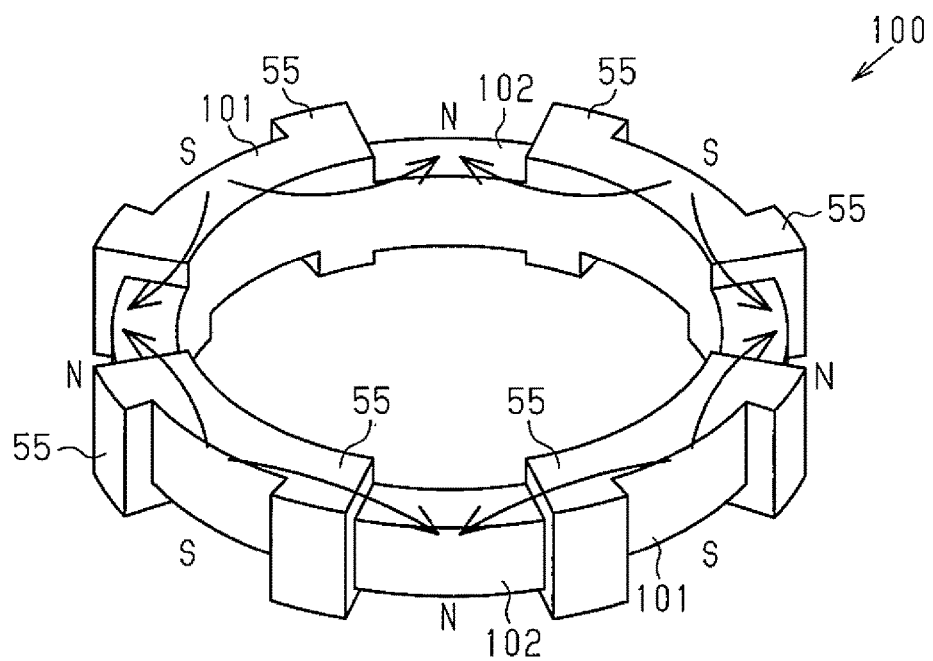
FIG. 12 is a perspective view of a rectifying magnet in FIG. 11.
Figure 13:
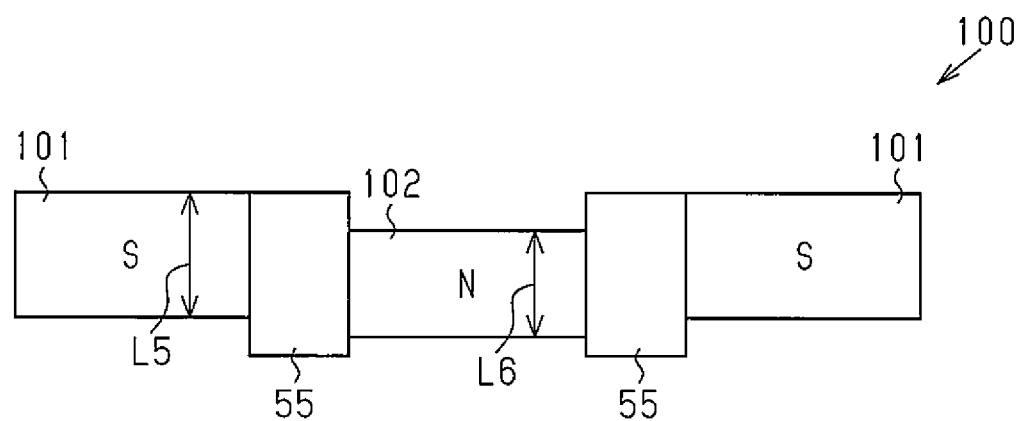
FIG. 13 is an expansion view illustrating the rectifying magnet in FIG. 12 in a planar state.

As illustrated in FIGS. 12 and 13, a rectification magnet 100 includes a first back-surface magnet portion 101, a second back-surface magnet portion 102, and the inter-pole magnet portion 55. The rectification magnet 100 is a polar anisotropic magnet magnetized so that each of the back-surface magnet portions 101 and 102 and the inter-pole magnet portion 55 suppresses leakage flux. The annular magnet 50 and the rectification magnet 100 are constituted by a material similar to that in the above-described first embodiment.

The first back-surface magnet portion 101 is arranged between a back surface 34a of the claw-shaped magnetic pole 32 (claw portion 34) of the first rotor core 30 and the outer peripheral surface 41c of the core base 41 of the second rotor core 40. The back-surface magnet portion 101 is magnetized mainly in the radial direction component such that a portion in contact with the back surface 34a (inner peripheral surface) of the claw portion 34 becomes the S-pole which is the same pole as its claw portion 34 and a portion in contact with the outer peripheral surface 41c of the core base 41 of the second rotor core 40 becomes the N-pole which is the same pole as its core base 41.

The second back-surface magnet portion 102 is arranged between a back surface 44a of the claw-shaped magnetic pole 42 (claw portion 44) of the second rotor core 40 and an outer peripheral surface 31c of the core base 31 of the first rotor core 30. The back-surface magnet portion 102 is magnetized mainly in the radial direction component such that a portion in contact with the back surface 44a (inner peripheral surface) of the claw portion 44 becomes the N-pole which is the same pole as its claw portion 44 and a portion in contact with the outer peripheral surface 31c of the core base 31 of the first rotor core 30 becomes the S-pole which is the same pole as its core base 31.

As illustrated in FIG. 13, the back-surface magnet portion 102 has an axial length L6 shorter than the axial length L5 of the back-surface magnet portion 101 (L5>L6) so as to differentiate a volume of the back-surface magnet portion 102 from a volume of the back-surface magnet portion 101.

The inter-pole magnet portion 55 is arranged in the peripheral direction between the first claw-shaped magnetic pole 32 and the second claw-shaped magnetic pole 42. The inter-pole magnet portion 55 is magnetized mainly in the peripheral direction component so that a portion closer to the first claw-shaped magnetic pole 32 in the peripheral direction is the N-pole and a portion closer to the second claw-shaped magnetic pole 42 is the S-pole.

Subsequently, an action of the brushless motor 11 configured as above will be described.

When a three-phase driving current is supplied to the winding 20 from the control circuit S, a rotating magnetic field is generated in the stator 16, and the rotor 21 is rotated/driven. At this time, rotation of the sensor magnet 62 faced with the magnetic sensor 63 causes a level of the detection signal outputted from the magnetic sensor 63 to switch in accordance with a rotation angle (position) of the rotor 21, and the three-phase driving current switched at an optimal timing is supplied from the control circuit S to the winding 20 on the basis of the detection signal. As a result, the rotating magnetic field is favorably generated, and the rotor 21 is continuously rotated/driven favorably.

Here, in the second embodiment, the back-surface magnet portion 102 on the back surface of the claw-shaped magnetic pole 42 of the second rotor core 40 has an axial length L6 shorter than an axial length L5 of the back-surface magnet portion 101 on the back surface of the claw-shaped magnetic pole 32 of the first rotor core 30. Thus, a distance between the claw-shaped magnetic pole 42 of the second rotor core 40 and the yoke housing 13 becomes longer, and the leakage flux can be suppressed. As a result, imbalance of the magnetic flux between the claw-shaped magnetic pole 32 and the claw-shaped magnetic pole 42 is suppressed.

Moreover, the claw-shaped magnetic pole 32 of the first rotor core 30 has the axial length longer than the axial length of the claw-shaped magnetic pole 42 of the second rotor core 40. As a result, magnetic resistance between the claw-shaped magnetic pole 32 of the first rotor core 30 and the stator 16 becomes lower than the magnetic resistance between the claw-shaped magnetic pole 42 of the second rotor core 40 and the stator 16. Here, the magnetic flux can easily leak to the yoke housing 13 from the core base 31 of the first rotor core 30 closer to the yoke housing 13 in the axial direction. However, as described above, the claw-shaped magnetic pole 32 of the first rotor core 30 has the axial length longer than the axial length of the claw-shaped magnetic pole 42 of the second rotor core 40. As a result, the magnetic resistance of the first rotor core 30 becomes relatively low and thus, leakage of the magnetic flux to the yoke housing 13 is suppressed. Moreover, regarding the second rotor core 40 relatively farther from the yoke housing 13, the leakage flux to the yoke housing 13 is less. Thus, assuming that the axial lengths of the claw-shaped magnetic pole 32 of the first rotor core 30 and the claw-shaped magnetic pole 42 of the second rotor core 40 are the same, the magnetic flux amount between the claw-shaped magnetic pole 42 of the second rotor core 40 and the stator 16 tends to become larger than the magnetic flux amount between the claw-shaped magnetic pole 32 of the first rotor core 30 and the stator 16. That is, the magnetic flux becomes imbalanced between the claw-shaped magnetic pole 32 and the claw-shaped magnetic pole 42. Thus, by making the axial length of the claw-shaped magnetic pole 42 of the second rotor core 40 shorter than the axial length of the claw-shaped magnetic pole 32 of the first rotor core 30, the magnetic resistance between the claw-shaped magnetic pole 42 of the second rotor core 40 and the stator 16 becomes high, and the magnetic flux imbalance between the claw-shaped magnetic pole 32 and the claw-shaped magnetic pole 42 can be suppressed.

Subsequently, the advantages of the second embodiment will be described.

(3) The leakage flux can easily occur between the back-surface magnet portion 102 and the yoke housing 13. The back-surface magnet portion 102 provided on the back surface of the claw-shaped magnetic pole 42 of the second rotor core 40 has the axial length shorter than the back-surface magnet portion 101 provided on the back surface of the claw-shaped magnetic pole 32 of the first rotor core 30. As a result, the interval between the yoke housing 13 and the back-surface magnet portion 102 is spaced away, whereby occurrence of the leakage flux can be suppressed, and the magnetic balance between the claw-shaped magnetic pole 32 and the claw-shaped magnetic pole 42 can be made favorable.

(4) The magnetic flux can easily leak to the yoke housing 13 from the core base 31 of the first rotor core 30 closer in the axial direction to the yoke housing 13 which is a magnetic body. However, by making the claw-shaped magnetic pole 32 of the first rotor core 30 longer, the magnetic resistance in the radial direction between the claw-shaped magnetic pole 32 and the stator 16 becomes small. Thus, the leakage flux to the yoke housing 13 can be reduced. As a result, output characteristics can be improved. Moreover, regarding the second rotor core 40 which is relatively farther from the yoke housing 13, the leakage flux to the yoke housing 13 is less. Thus, if the claw-shaped magnetic pole 32 of the first rotor core 30 has the same axial length as the axial length of the claw-shaped magnetic pole 42 of the second rotor core 40, the magnetic flux amount between the claw-shaped magnetic pole 42 of the second rotor core 40 and the stator 16 tends to become larger than the magnetic flux amount between the claw-shaped magnetic pole 32 of the first rotor core 30 and the stator 16. That is, the magnetic flux imbalance occurs between the claw-shaped magnetic pole 32 and the claw-shaped magnetic pole 42. Thus, since the claw-shaped magnetic pole 42 of the second rotor core 40 has the axial length shorter than the axial length of the claw-shaped magnetic pole 32 of the first rotor core 30, the magnetic resistance between the claw-shaped magnetic pole 42 of the second rotor core 40 and the stator 16 becomes high. As a result, the magnetic flux imbalance between the claw-shaped magnetic pole 32 and the claw-shaped magnetic pole 42 is further suppressed, and the magnetic balance between the claw-shaped magnetic pole 32 and the claw-shaped magnetic pole 42 can be made favorable.

(5) The distance in the axial direction between the tip end surface 44b of the claw-shaped magnetic pole 42 of the second rotor core 40 and the yoke housing 13 can be ensured. Thus, the leakage flux from the tip end surface 44b of the claw-shaped magnetic pole 42 to the yoke housing 13 can be suppressed, and an interlinkage flux amount to the stator 16 can be increased.

(6) The back-surface magnet portions 101 and 102 are integrally formed with the inter-pole magnet portion 55. Thus, an increase in the number of components can be suppressed.

The above-described first and second embodiments can be changed as follows.

In the first and second embodiments, the rectification magnets 52 and 100 do not have to be constituted by a polar anisotropic magnet.

Figure 7:
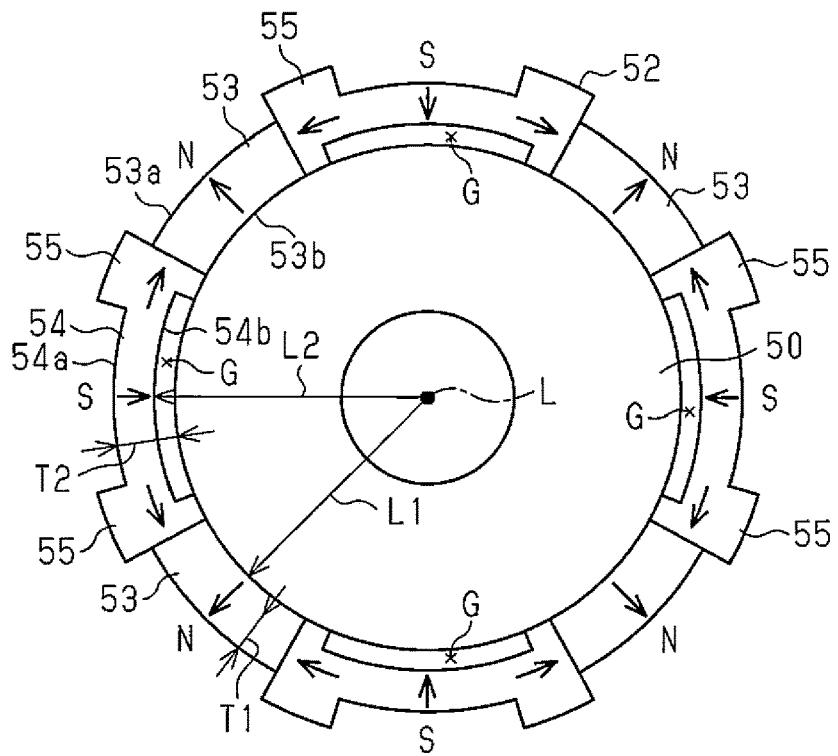
FIG. 7 is a plan view of the rectifying magnet and the annular magnet in another example of the first embodiment.

As illustrated in FIG. 7, the rectification magnet 52 may be magnetized such that a magnetic orientation direction of the inter-pole magnet portion 55 is a peripheral direction, and the magnetic orientation directions of the back-surface magnet portions 53 and 54 are radial directions.

In the first and second embodiments, the outer peripheral surface 50b of the annular magnet 50 does not have to be circular.

Figure 8:
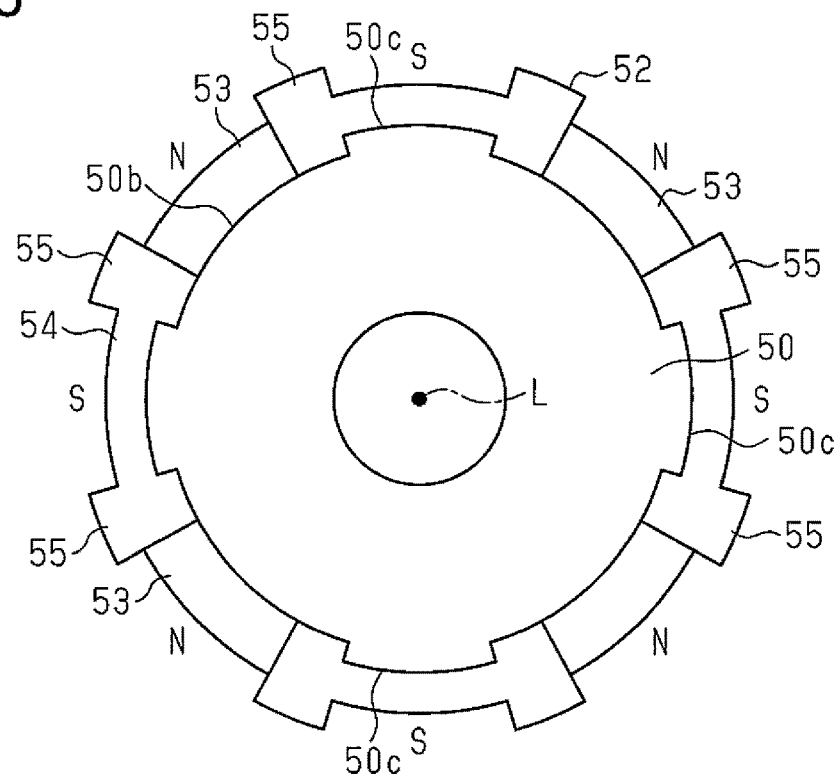
FIG. 8 is a plan view of the rectifying magnet and the annular magnet in another example of the first embodiment.

For example, a configuration illustrated in FIG. 8 may be employed. A projection portion 50c is provided on the outer peripheral surface 50b of the annular magnet 50. The projection portion 50c abuts against the relatively thin back-surface magnet portion 54 and fills the gap G. Such configuration can increase a main magnetic flux component.

Figure 9:
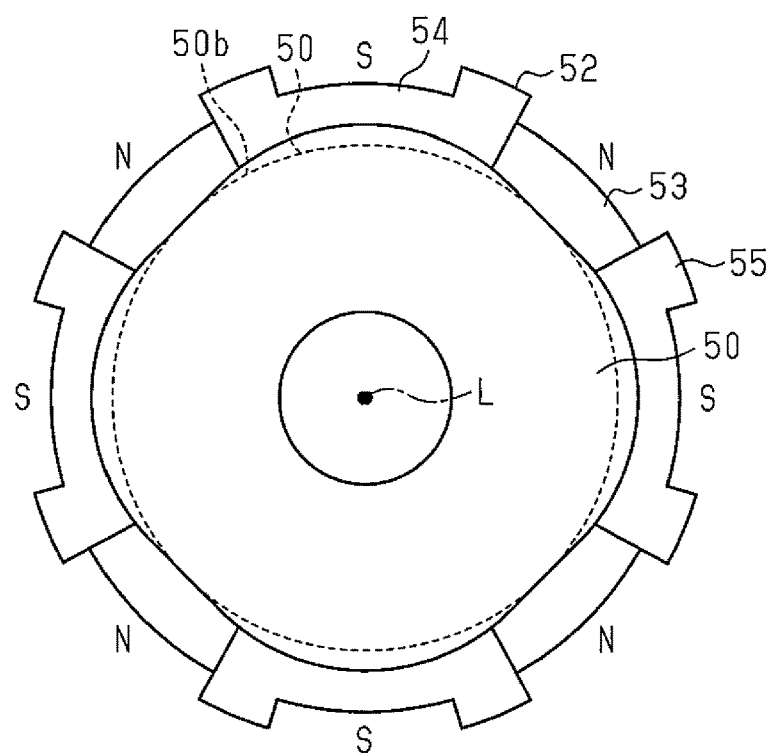
FIG. 9 is a plan view of the rectifying magnet and the annular magnet in another example of the first embodiment.

Moreover, a configuration illustrated in FIG. 9 may be employed. The back-surface magnet portion 53 is the thickest at a substantial center in the peripheral direction and becomes gradually thinner toward the outer side in the peripheral direction. The back-surface magnet portion 54 is the thinnest at the substantial center in the peripheral direction and becomes gradually thicker toward the outer side in the peripheral direction. In this case, it is preferable that the inter-pole magnet portion 55 has a thickness gradually changing so as to continue to the adjacent back-surface magnet portions 53 and 54. Moreover, as indicated by a solid line in FIG. 9, the annular magnet 50 may have a shape following the back-surface magnet portions 53 and 54 and the inter-pole magnet portion 55. Moreover, as indicated by a broken line in FIG. 9, the annular magnet 50 may have a circular outer peripheral surface 50b. In this configuration, the annular magnet 50 is inscribed in a substantial center in the peripheral direction of the back-surface magnet portion 53 which is the thickest portion.

In the first and second embodiments, the inter-pole magnet portion 55 and the back-surface magnet portions 53, 54, 101, and 102 may be separate bodies.

In the first and second embodiments, the inter-pole magnet portion 55 may be omitted.

In the first and second embodiments, the support plate 61 and the sensor magnet 62 are supported by the rotor 21, but it is only necessary that the sensor magnet 62 is configured to be capable of integral rotation with the rotating shaft 22. As an example, the support plate 61 may be fixed (press-fit/fix, for example) to the rotating shaft 22 by giving an interval in the axial direction with respect to the rotor 21 (second rotor core 40).

In the first and second embodiments, the sleeve 51 and the annular magnet 50 are fixed by an adhesive made of a hardening resin not permeable to a magnetic flux. The sleeve 51 and the annular magnet 50 may be fixed by an adhesive permeable to the magnetic flux.

In the first and second embodiments, the sleeve 51 which is a non-magnetic body is made of stainless. It is only necessary that the sleeve 51 is non-magnetic and the sleeve 51 may be made of aluminum or a resin other than stainless.

In the first and second embodiments, the sleeve 51 is interposed between the annular magnet 50 and the rotating shaft 22, but the sleeve 51 may be omitted. In this case, the annular magnet 50 can be directly fixed to the rotating shaft 22.

In the first and second embodiments, the number of poles of the rotor 21 is set to "8", and the number of the teeth 17a of the stator 16 is set to "12". The number of poles of the rotor 21 and the number of teeth 17a of the stator 16 may be changed. For example, the number of poles of the rotor 21 may be set to "8", and the number of teeth 17a of the stator 16 may be set to "12".

In the first and second embodiments, the stator 16 does not have to be configured such that the winding 20 is wound around the teeth 17a. For example, the stator core may be configured by combining a first stator core having a plurality of claw-shaped magnetic poles in the peripheral direction and a second stator core having a plurality of claw-shaped magnetic poles in the peripheral direction. In this case, the winding is arranged between the first stator core and the second stator core, and the winding causes the plurality of claw-shaped magnetic poles aligned in the peripheral direction to function as alternately different magnetic poles.

The first and second embodiments and each of the variations may be combined as appropriate.

Third Embodiment

Subsequently, a third embodiment of a motor will be described.

Figure 14:
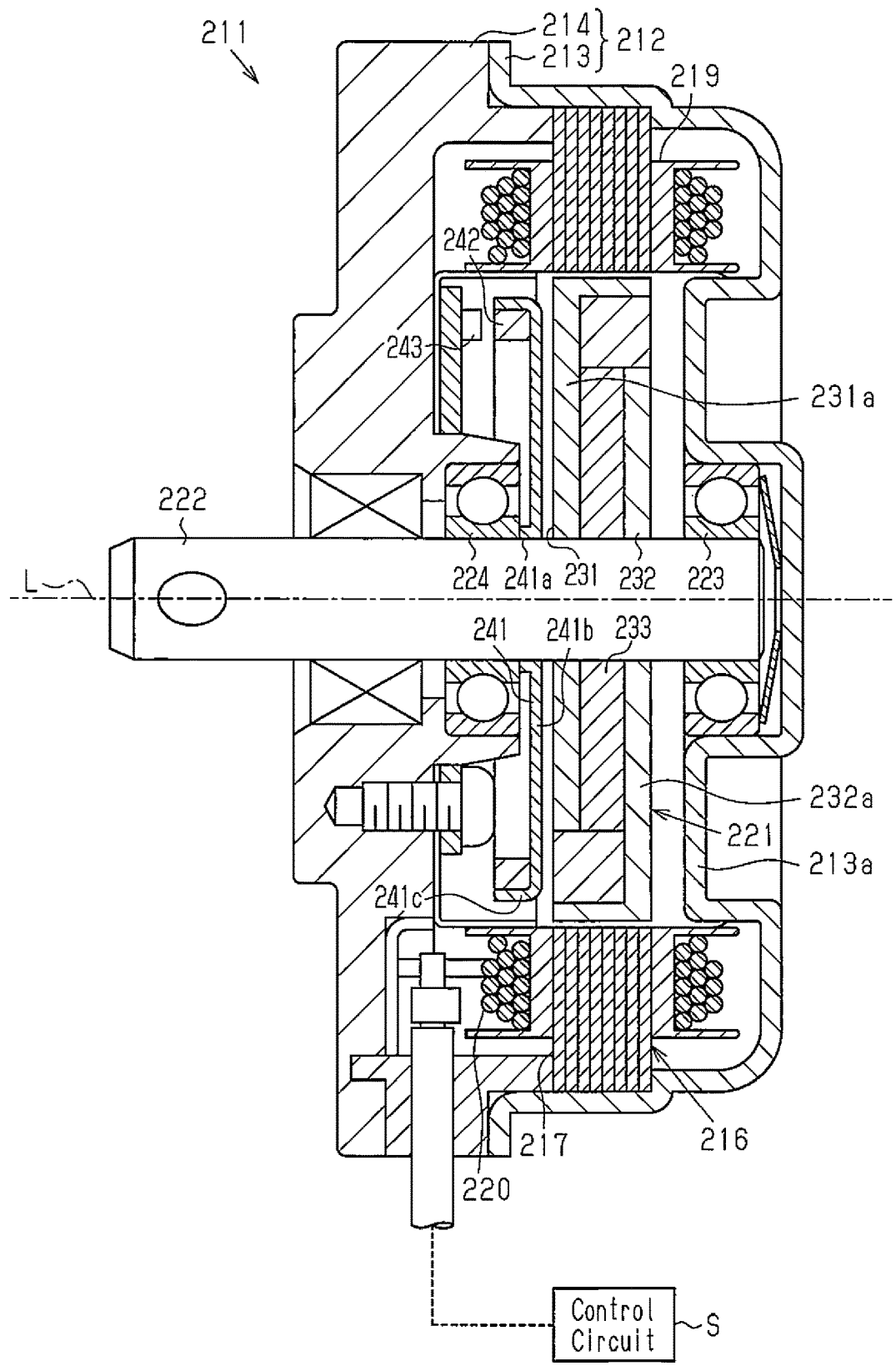
FIG. 14 is a sectional view of a motor of a third embodiment of the present invention.

As illustrated in FIG. 14, a motor case 212 of a brushless motor 211 as a motor has a yoke housing 213 formed having a substantially cylindrical shape with a bottom and an end frame 214 as a lid portion for closing an opening of a front side (left side in FIG. 14) in the axial direction of this yoke housing 213. The yoke housing 213 is constituted by a magnetic body (iron, for example), for example. The end frame 214 is constituted by a non-magnetic body (a resin material, for example), for example.

Figure 15:
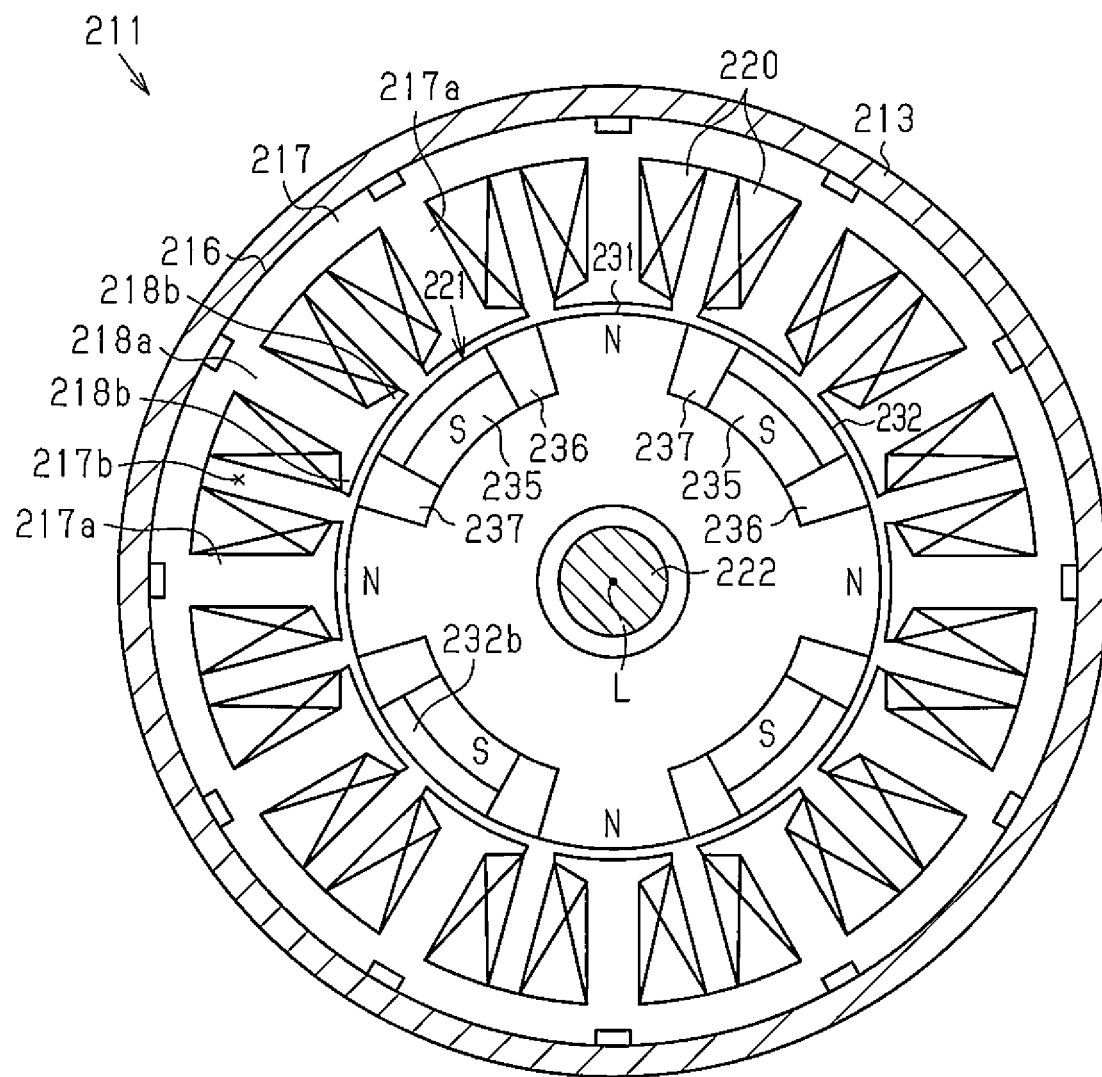
FIG. 15 is a plan view of the motor in FIG. 14.

As illustrated in FIGS. 14 and 15, a stator 216 is fixed to an inner peripheral surface of the yoke housing 213. The stator 216 is provided with a stator core 217 having a plurality of teeth 217a extending to an inside in the radial direction and a winding 220 wound around the teeth 217a of the stator core 217 through an insulator 219. The stator 216 generates a rotating magnetic field when a driving current is supplied to the winding 220 from the external control circuit S.

As illustrated in FIG. 15, the stator core 217 has twelve teeth 217a. Therefore, the number of slots 217b formed between the teeth 217a is also twelve. Each of the teeth 217a is provided with a winding portion 218a and a protruding portion 218b protruding to both sides in a peripheral direction from an end portion inside in the radial direction of the winding portion 218a. In the winding portion 218a, U-phase, V-phase, and W-phase windings 220 are wound in a concentrated winding.

As illustrated in FIG. 14, a rotor 221 of the brushless motor 211 has a rotating shaft 222 and is arranged inside the stator 216. The rotating shaft 222 is a non-magnetic body metal shaft and is supported rotatably by bearings 223 and 224 supported by a bottom portion 213a of the yoke housing 213 and an end frame 214.

Figure 16:
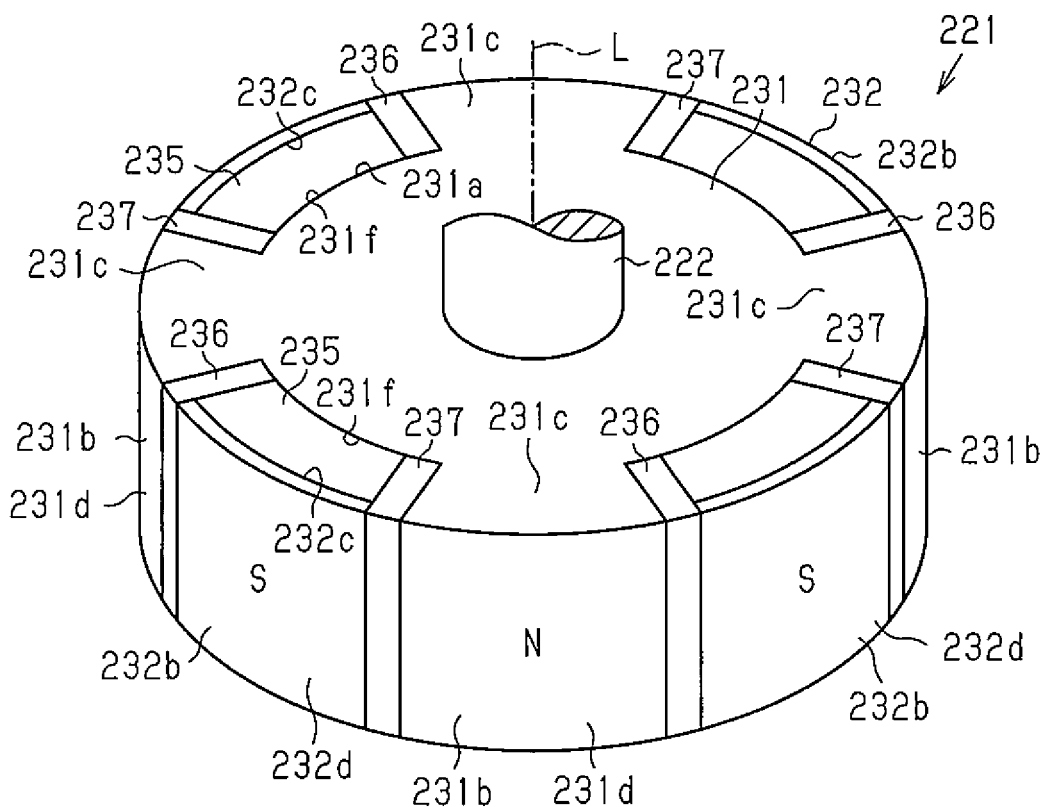
FIG. 16 is a perspective view of a rotor in FIG. 15.
Figure 17:
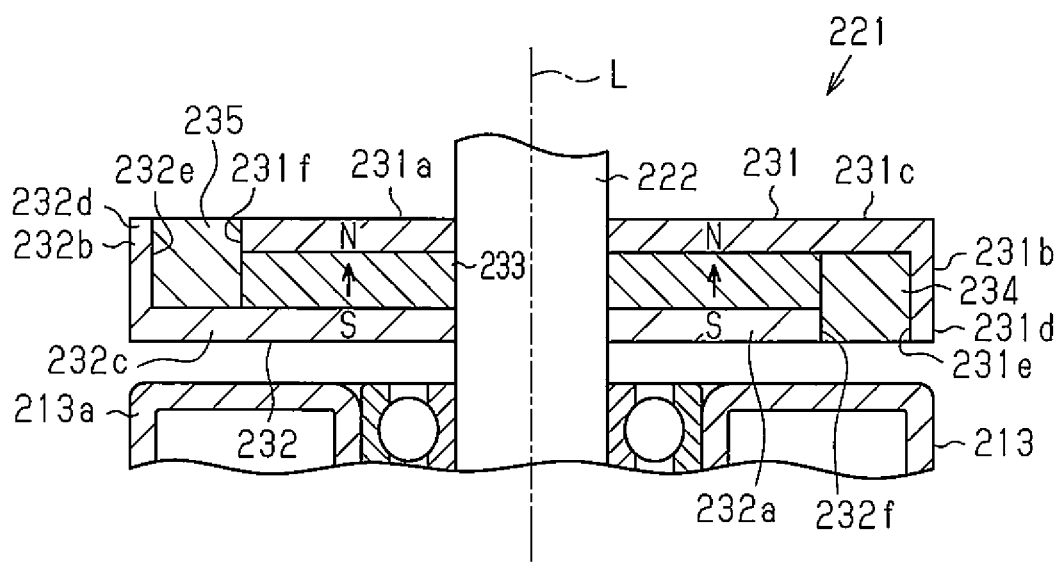
FIG. 17 is a sectional view schematically illustrating a configuration of a vicinity of the rotor in FIG. 14.

As illustrated in FIGS. 16 and 17, the rotor 221 includes first and second rotor cores 231 and 232, an annular magnet 233 as a field magnet interposed between the first and second rotor cores 231 and 232 in the axial direction (direction along an axis L). The first and second rotor cores 231 and 232 are fixed to the rotating shaft 222 while an axial interval between each is held by press-fit of the rotating shaft 222. Moreover, the rotor 221 includes back-surface auxiliary magnets 234 and 235 and inter-pole magnets 236 and 237.

As illustrated in FIG. 14, in a state in which the rotor 221 is arranged in a motor case 212, the rotor core having a core base 231a which will be described later arranged closer to the end frame 214 in the axial direction with respect to the annular magnet 233 is made the first rotor core 231, and the rotor core having a core base 232a arranged closer to the bottom portion 213a in the axial direction with respect to the annular magnet 233 is made the second rotor core 232.

As illustrated in FIGS. 16 and 17, the first rotor core 231 has a substantially disc-shaped core base 231a and a plurality of (four in the third embodiment) claw-shaped magnetic poles 231b formed at equal intervals on an outer peripheral portion of the core base 231a. Each of the claw-shaped magnetic poles 231b protrudes to an outside in the radial direction and also extends in the axial direction. In more detail, the claw-shaped magnetic pole 231b has a protruding portion 231c protruding to the outside in the radial direction from the outer peripheral portion of the core base 231a and a claw portion 231d provided at a tip end of the protruding portion 231c and extending in the axial direction. The protruding portion 231c is formed having a fan shape when seen from the axial direction. The claw portion 231d has a fan-shaped section in a direction orthogonal to the axis L.

The second rotor core 232 has the same shape as the first rotor core 231. The second rotor core 232 has a substantially disc-shaped core base 232a and a plurality of claw-shaped magnetic poles 232b formed at equal intervals on an outer peripheral portion of the core base 232a. Each of the claw-shaped magnetic poles 232b protrudes to an outside in the radial direction and also extends in the axial direction. In more detail, the claw-shaped magnetic pole 232b has a protruding portion 232c protruding to the outside in the radial direction from the outer peripheral portion of the core base 232a and a claw portion 232d provided at a tip end of the protruding portion 232c and extending in the axial direction. The protruding portion 232c is formed having a fan shape when seen from the axial direction. The claw portion 232d has a fan-shaped section in a direction orthogonal to the axis L.

Then, the rotating shaft 222 is press-fitted into center holes of the rotor cores 231 and 232. The rotor cores 231 and 232 are fixed to the rotating shaft 222 so that a distance between outer surfaces in the axial direction of the core bases 231a and 232a (distance between opposing side surfaces) becomes a distance set in advance. At this time, each of the claw-shaped magnetic poles 232b of the second rotor core 232 is arranged between each of the claw-shaped magnetic poles 231b of the first rotor core 231. Moreover, the annular magnet 233 is arranged (sandwiched) between each of the core bases 231a and 232a of the first and second rotor cores 231 and 232 in the axial direction.

The annular magnet 233 is a magnet such as a ferrite magnet, a neodymium magnet or the like and is formed annularly having a center hole formed. The annular magnet 233 is magnetized in the axial direction so that the claw-shaped magnetic pole 231b of the first rotor core 231 functions as a first magnetic pole (N-pole in the third embodiment) and the claw-shaped magnetic pole 232b of the second rotor core 232 functions as a second magnetic pole (S-pole in the third embodiment). That is, the rotor 221 of the third embodiment is a rotor with a so-called Lundell structure using the annular magnet 233 as a field magnet.

The rotor 221 is configured such that the four claw-shaped magnetic poles 231b to be the N-poles and the four claw-shaped magnetic poles 232b to be the S-poles are alternately arranged in the peripheral direction. The number of poles of the rotor 221 is set to eight (the number of pole pairs is four). That is, the brushless motor 211 in the third embodiment is configured such that the number of poles of the rotor 221 is "8", and the number of teeth 217a of the stator 216 is "12". That is, the brushless motor 211 is configured such that the number of poles of the rotor 221 is 2n (where n is a natural number and 4 in the third embodiment), and the number of slots 217b (slot number) is 3n so that the ratio of the number of poles and the number of slots becomes 2:3.

The first back-surface auxiliary magnet 234 is arranged between a back surface 231e (surface inside in the radial direction) of each of the claw-shaped magnetic poles 231b of the first rotor core 231 and an outer peripheral surface 232f of the core base 232a of the second rotor core 232. The back-surface auxiliary magnet 234 has a substantially fan-shaped section in the direction orthogonal to the axis L. The back-surface auxiliary magnet 234 is magnetized such that a portion in contact with the back surface 231e of the claw-shaped magnetic pole 231b becomes the N-pole which is the same pole as the claw-shaped magnetic pole 231b and a portion in contact with the outer peripheral surface 232f of the core base 232a of the second rotor core 232 becomes the S-pole which is the same pole as its core base 232a.

Moreover, the second back-surface auxiliary magnet 235 is arranged between a back surface 232e of each of the claw-shaped magnetic poles 232b of the second rotor core 232 and an outer peripheral surface 231f of the core base 231a of the first rotor core 231. The back-surface auxiliary magnet 235 has a fan-shaped section in the direction orthogonal to the axis L. The back-surface auxiliary magnet 235 is magnetized such that a portion in contact with the back surface 232e of the claw-shaped magnetic pole 232b becomes the S-pole and a portion in contact with the outer peripheral surface 231f of the core base 231a of the first rotor core 231 becomes the N-pole. As the back-surface auxiliary magnets 234 and 235, a ferrite magnet, for example, can be used.

Moreover, as illustrated in FIGS. 15 and 16, the inter-pole magnets 236 and 237 are arranged between the claw-shaped magnetic pole 231b and the claw-shaped magnetic pole 232b in the peripheral direction.

As illustrated in FIGS. 14 and 17, the rotor 221 is configured such that the core base 232a of the second rotor core 232 is located at a position closer to the yoke housing 213 (bottom portion 213a) in the axial direction than the core base 231a of the first rotor core 231.

Here, the first and second rotor cores 231 and 232 are both made of carbon steel. In more detail, for the second rotor core 232 located at the position closer to the bottom portion 213a of the yoke housing 213, a metal material (low carbon steel) having a content of carbon lower than that of the first rotor core 231 is used. As a result, saturation magnetic flux density (limit point of a flow of a magnetic flux per unit area) of the second rotor core 232 becomes higher than the saturation magnetic flux density of the first rotor core 231. Since the first and second rotor cores 231 and 232 have the same shape, the second rotor core 232 is configured such that the second rotor core 232 is magnetically saturated less easily than the first rotor core 231.

Moreover, as illustrated in FIG. 14, in the rotor 221, a sensor magnet 242 is provided through a substantially disc-shaped magnet fixing member 241. In more detail, the magnet fixing member 241 has a disc portion 241b in which a boss portion 241a is formed at a center and a cylinder portion 241c extending cylindrically from an outer edge of this disc portion 241b. To the magnet fixing member 241, the annular sensor magnet 242 is fixed so that it abuts against an inner peripheral surface of the cylinder portion 241c and a surface of the disc portion 241b. The magnet fixing member 241 is located at a position closer to the first rotor core 231, and the boss portions 241a is externally fitted with the rotating shaft 222 and fixed to the rotating shaft 222.

Then, in the end frame 214, a hall IC 243 as a magnetic sensor is provided at a position opposite in the axial direction to the sensor magnet 242. The hall IC 243 outputs an H-level detection signal and an L-level detection signal to the control circuit S when it senses magnetic fields of the N-pole and the S-pole on the basis of the sensor magnet 242, respectively.

Subsequently, an action of the brushless motor 211 constituted as above will be described. When a three-phase driving current is supplied from the control circuit S to the winding 220, a rotating magnetic field is generated in the stator 216, and the rotor 221 is rotated/driven. At this time, by means of rotation of the sensor magnet 242 opposite to the hall IC 243, the level of the detection signal outputted from the hall IC 243 is switched in accordance with a rotation angle (position) of the rotor 221, and the three-phase driving current switched at optimal timing is supplied to the winding 220 from the control circuit S on the basis of the detection signal. As a result, the rotating magnetic field is favorably generated, and the rotor 221 is continuously rotated/driven favorably.

Figure 18:
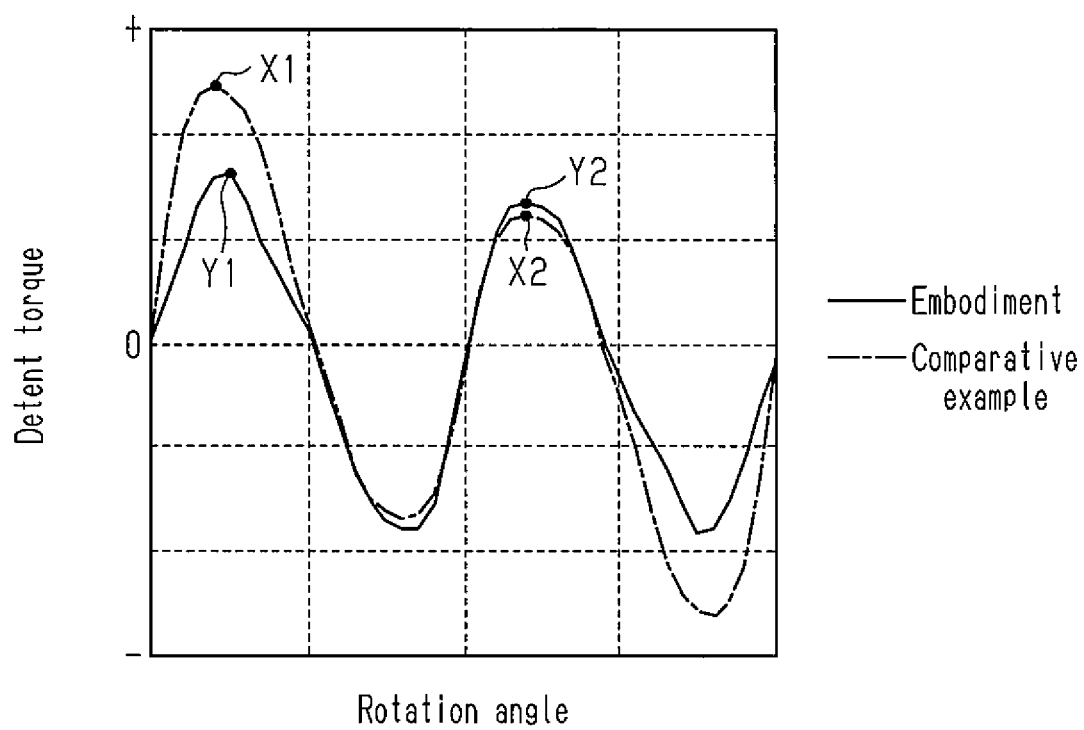
FIG. 18 is a graph for explaining a detent torque of the rotor in FIG. 14.

Here, assume a case in which the first and second rotor cores 231 and 232 are made of the same material, for example (that is, a case in which the material with the same saturation magnetic flux density is used). In this case, in the first rotor core 231 farther from the bottom portion 213a of the yoke housing 213 in the axial direction, there is little leakage flux between that and the yoke housing 213 (bottom portion 213a). Thus, a detent torque can become higher as indicated by X1 in FIG. 18. In the second rotor core 232 closer to the bottom portion 213a of the yoke housing 213, leakage flux is generated between that and the bottom portion 213a of the yoke housing 213. Thus, the detent torque can become lower as indicated by X2 in FIG. 18. Thus, the detent torque becomes imbalanced between the N-pole and the S-pole.

Thus, in the third embodiment, the second rotor core 232 closer to the bottom portion 213a is constituted by a material (low carbon steel) with higher saturation magnetic flux density than the first rotor core 231. That is, since the saturation magnetic flux density of the first rotor core 231 closer to the end frame 214 and with less occurrence of the leakage flux is lower than the saturation magnetic flux density of the second rotor core 232, magnetic saturation can occur more easily in the first rotor core 231. As a result, a magnetic flux amount acting between the claw-shaped magnetic pole 231b of the first rotor core 231 and the stator 216 decreases. Thus, the detent torque is reduced in the first rotor core 231 as indicated by Y1 in FIG. 18.

Then, by constituting the second rotor core 232 by a material with high saturation magnetic flux density, the magnetic flux flows more easily in the second rotor core 232. Thus, the leakage flux to the yoke housing 213 is reduced, and the detent torque slightly increases as indicated by Y2 in FIG. 18. As described above, a difference between the detent torque at the first rotor core 231 (N-pole) and the detent torque at the second rotor core 232 (S-pole) decreases, and the balance of the detent torque is improved.

Subsequently, advantages of the third embodiment will be described.

(7) The second rotor core 232 closer to the bottom portion 213a is formed of a metal material with a carbon content lower than that of the first rotor core 231. As a result, the second rotor core 232 has saturation magnetic flux density higher than the saturation magnetic flux density of the first rotor core 231. As a result, even if the first and second rotor cores 231 and 232 have the same shape as in the third embodiment, the second rotor core 232 is constituted so as to be magnetically saturated less easily than the first rotor core 231. Therefore, the magnetic flux is made to flow more easily in the second rotor core 232 closer to the bottom portion 213a of the yoke housing 213 and as a result, the leakage flux to the yoke housing 213 can be reduced. Thus, imbalance in the magnetic flux amount between the first rotor core 231 and the second rotor core 232 can be suppressed, and the balance of the detent torque can be made favorable.

The third embodiment may be changed as follows.

In the third embodiment, the second rotor core 232 closer to the bottom portion 213a is formed of a metal material with a carbon content lower than that of the first rotor core 231. As a result, while the first and second rotor cores 231 and 232 have the same shape, the saturation magnetic flux density of the second rotor core 232 is made higher than the saturation magnetic flux density of the first rotor core 231. The third embodiment is not limited to this configuration. For example, the second rotor core 232 may be formed of a metal material subjected to annealing for magnetic characteristic improvement. By applying annealing to the second rotor core 232, while the first and second rotor cores 231 and 232 are formed having the same shape and of the same material, the saturation magnetic flux density of the second rotor core 232 can be made higher than the saturation magnetic flux density of the first rotor core 231.

Moreover, for example, the first rotor core 231 may be formed of a cold rolled steel plate, while the second rotor core 232 may be formed of a hot rolled steel plate. By means of this configuration, too, while the first and second rotor cores 231 and 232 are formed having the same shape and of the same material, the saturation magnetic flux density of the second rotor core 232 can be made higher than the saturation magnetic flux density of the first rotor core 231.

In the third embodiment, the second rotor core 232 is formed of a material having the saturation magnetic flux density higher than the saturation magnetic flux density of the material of the first rotor core 231. As a result, the second rotor core 232 is constituted so as not to be magnetically saturated easily. The third embodiment is not limited to this configuration. For example, a plate thickness (plate thickness of the core base 232a) in the axial direction of the second rotor core 232 may be larger than a plate thickness (plate thickness of the core base 231a) in the axial direction of the first rotor core 231. According to this configuration, while the first and second rotor cores 231 and 232 are formed of the same material, the second rotor core 232 is constituted so as not to be magnetically saturated easily.

Each of the above-described variations and the above-described embodiments may be combined as appropriate.

In the third embodiment, the number of poles of the rotor 221 is set to "8", and the number of teeth 217a of the stator 216 is set to "12". The number of the poles of the rotor 221 or the number of teeth 217a of the stator 216 may be changed as appropriate.

In the third embodiment, the rotor 221 does not have to have the back-surface auxiliary magnets 234 and 235 and the inter-pole magnets 236 and 237. For example, the rotor 221 may have only the back-surface auxiliary magnet, may have only the inter-pole magnet, or does not have to have the back-surface auxiliary magnets and the inter-pole magnets.

In the third embodiment, the stator 216 does not have to be configured such that the winding 220 is wound around the teeth 217a. For example, the stator core may be configured by combining a first stator core having a plurality of claw-shaped magnetic poles in the peripheral direction and a second stator core having a plurality of claw-shaped magnetic poles in the peripheral direction. In this case, the winding is arranged between the first stator core and the second stator core, and the winding causes the plurality of claw-shaped magnetic poles aligned in the peripheral direction to function as alternately different magnetic poles.

In the third embodiment, the end frame 214 does not have to be constituted by a resin material. For example, the end frame 214 may be constituted by a non-magnetic body material such as aluminum or stainless steel (SUS) and the like. Moreover, the end frame 214 may be constituted by a magnetic body material as long as the condition that the distance in the axial direction between the end frame 214 and the rotor 221 is larger than the distance in the axial direction between the yoke housing 213 (bottom portion 213a) and the rotor is satisfied.

Fourth Embodiment

A fourth embodiment of a motor will be described below.

Figure 19:
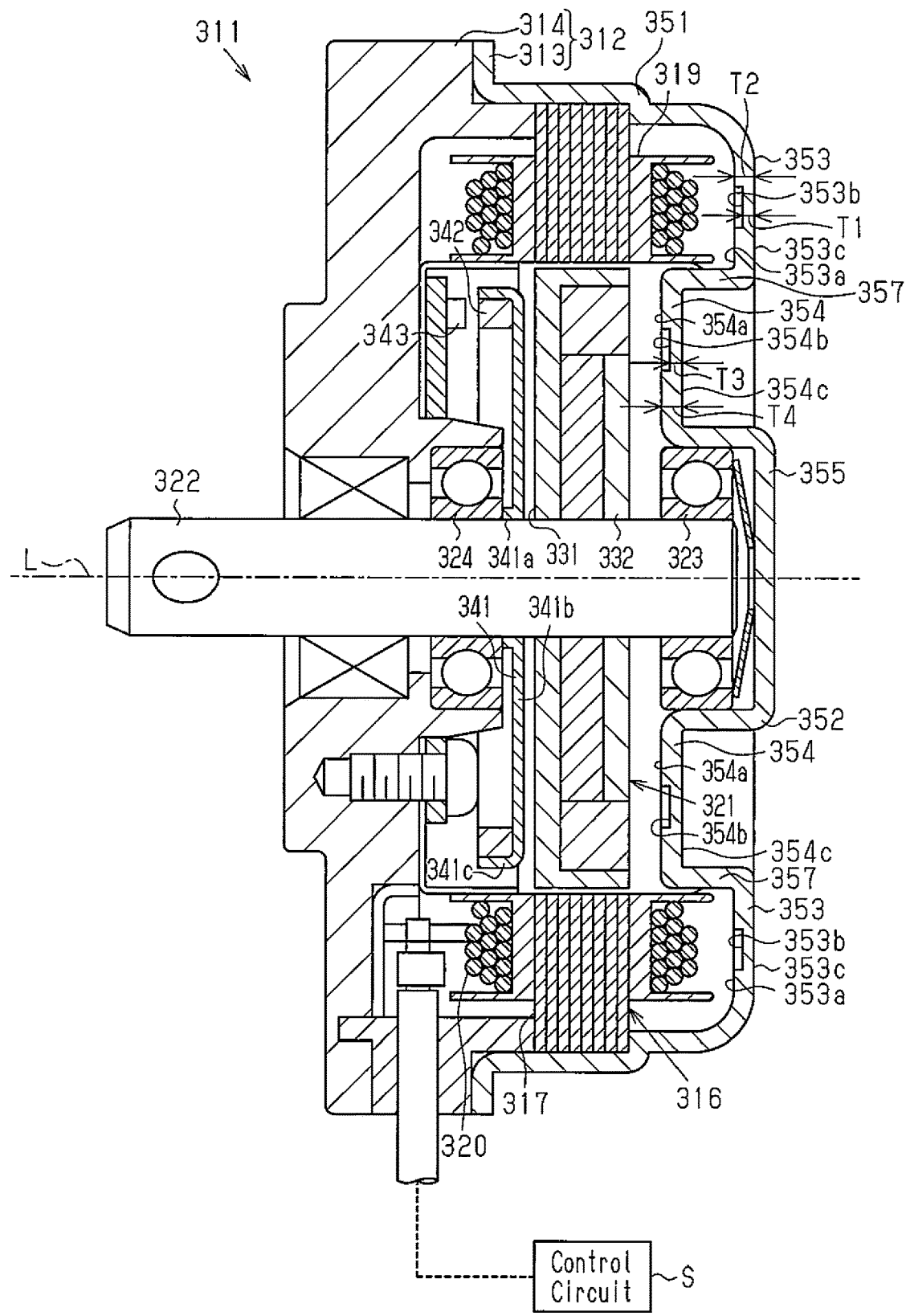
FIG. 19 is a sectional view of a brushless motor according to a fourth embodiment of the present invention.

As illustrated in FIG. 19, a case 312 of a brushless motor 311 has a yoke housing 313 formed having a substantially cylindrical shape with a bottom and an end plate 314 for closing an opening of a front side (left side in FIG. 19) of the yoke housing 313. The yoke housing 313 is constituted by a magnetic body (iron, for example). The end plate 314 is constituted by a non-magnetic body (a resin material, for example).

As illustrated in FIG. 19, a stator 316 is fixed to an inner peripheral surface of the yoke housing 313. The stator 316 is provided with a stator core 317 having a plurality of teeth 317a extending to an inside in the radial direction and a winding 320 wound around the teeth 317a of the stator core 317 through an insulator 319. The stator 316 generates a rotating magnetic field when a driving current is supplied to the winding 320 from the external control circuit S.

Figure 20:
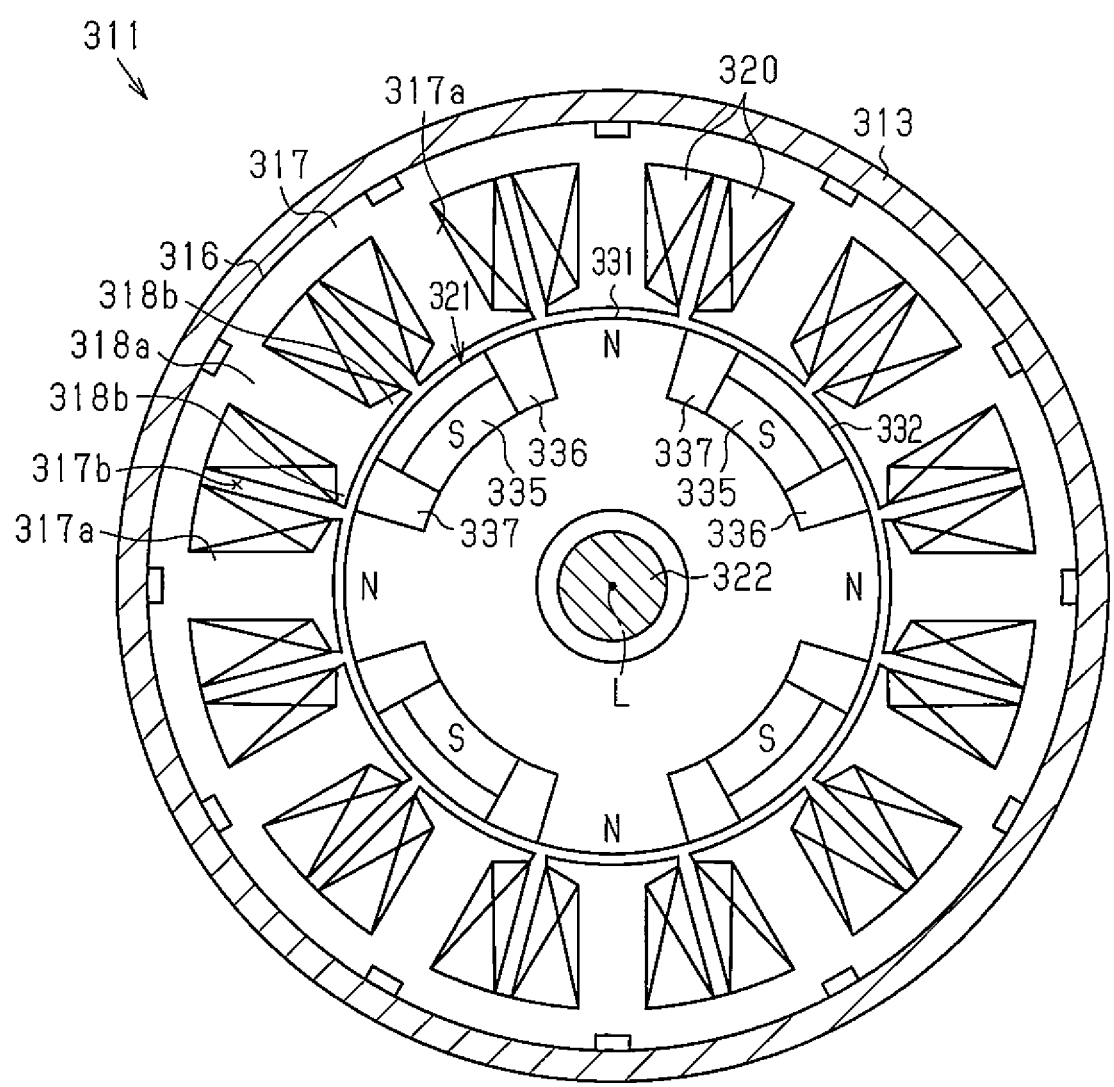
FIG. 20 is a plan view of the brushless motor in FIG. 19.

As illustrated in FIG. 20, the stator core 317 has twelve teeth 317a. Therefore, the number of slots 317b formed between the teeth 317a is also twelve.

As illustrated in FIG. 20, each of the teeth 317a is provided with a winding portion 318a and a protruding portion 318b protruding to both sides in a peripheral direction from an end portion (tip end) inside in the radial direction of the winding portion 318a. In the winding portion 318a, U-phase, V-phase, and W-phase windings 320 are wound in a concentrated winding.

As illustrated in FIGS. 19 and 20, a rotor 321 of the brushless motor 311 has a rotating shaft 322 and is arranged inside the stator 316. The rotating shaft 322 is a non-magnetic body metal shaft and is supported rotatably by bearings 323 and 324 supported by a bottom portion 352 of the yoke housing 313 and an end plate 314.

Figure 21:
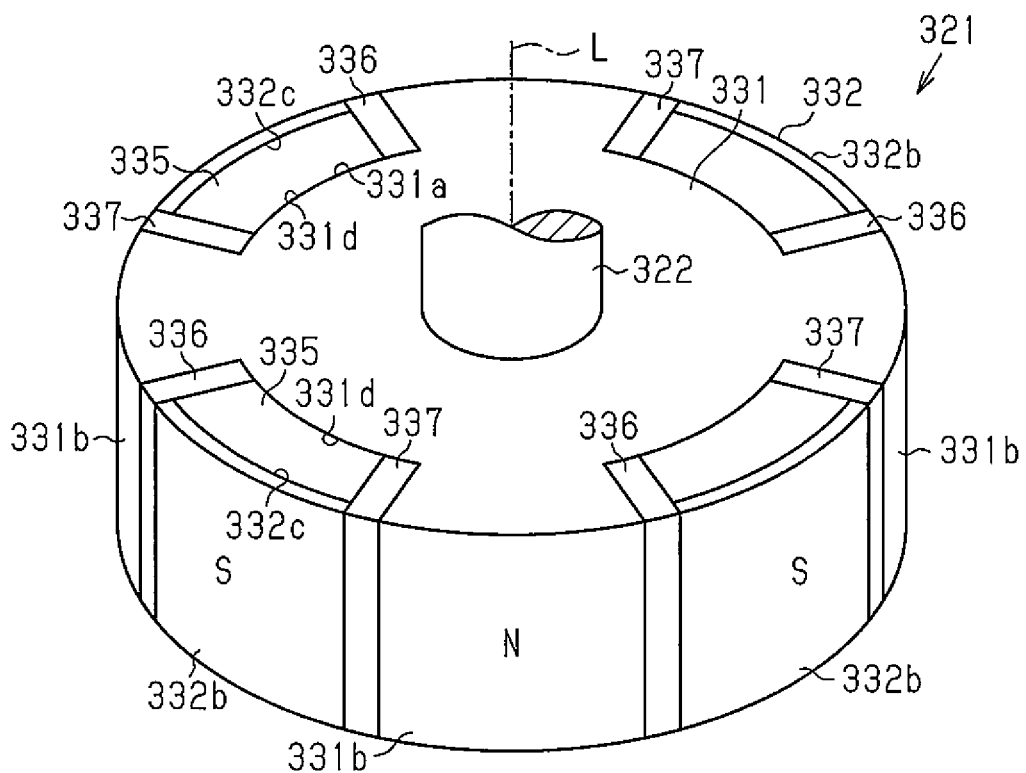
FIG. 21 is a perspective view of a rotor in FIG. 20.
Figure 22:
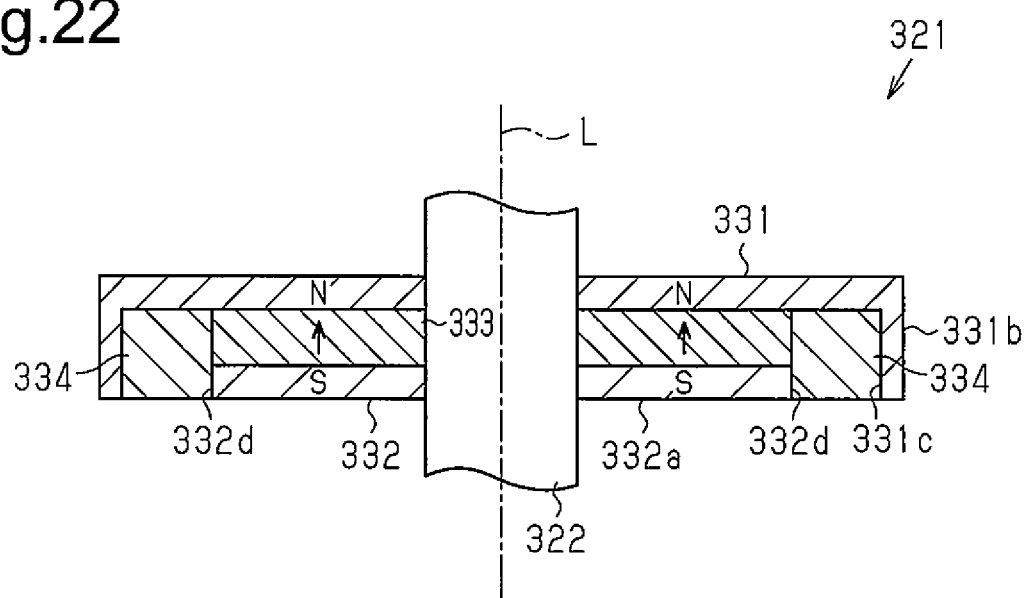
FIG. 22 is a sectional view of the rotor in FIG. 21.

As illustrated in FIGS. 21 and 22, the rotor 321 includes first and second rotor cores 331 and 332 and an annular magnet 333 as a field magnet interposed between the first rotor core 331 and the second rotor core 332 in the axial direction (direction along an axis L). The first and second rotor cores 331 and 332 are fixed to the rotating shaft 322 while an axial interval between each is held by press-fit of the rotating shaft 322. Moreover, the rotor 321 includes back-surface auxiliary magnets 334 and 335 and inter-pole magnets 336 and 337.

As illustrated in FIGS. 21 and 22, the first rotor core 331 has a substantially disc-shaped first core base 331a and a plurality of (five in the fourth embodiment) first claw-shaped magnetic poles 331b formed at equal intervals on an outer peripheral portion of the core base 331a. Each of the first claw-shaped magnetic poles 331b protrudes to an outside in the radial direction and also extends in the axial direction.

As illustrated in FIGS. 21 and 22, the second rotor core 332 has the same shape as that of the first rotor core 331. The second rotor core 332 has a substantially disc-shaped second core base 332a and a plurality of second claw-shaped magnetic poles 332b formed at equal intervals on an outer peripheral portion of the second core base 332a. Each of the second claw-shaped magnetic poles 332b protrudes to an outside in the radial direction and also extends in the axial direction. Then, the rotating shaft 322 is press-fitted into center holes of the first and second rotor cores 331 and 232. The first and second rotor cores 331 and 332 are fixed to the rotating shaft 322 so that a distance between outer surfaces in the axial direction of the first and second core bases 331a and 332a (distance between opposing side surfaces) becomes a certain distance set in advance. At this time, the second rotor core 332 is assembled to the first rotor core 331 so that the annular magnet 333 is arranged (sandwiched) between the first core base 331a and the second core base 332a in the axial direction. At this time, each of the second claw-shaped magnetic poles 332b is arranged between the first claw-shaped magnetic poles 331b adjacent to each other in the peripheral direction.

The annular magnet 333 is a magnet such as a ferrite magnet, a neodymium magnet or the like and is formed annularly having a center hole formed. The annular magnet 333 is magnetized in the axial direction so that the first claw-shaped magnetic pole 331b functions as a first magnetic pole (N-pole in the fourth embodiment) and the second claw-shaped magnetic pole 332b functions as a second magnetic pole (S-pole in the fourth embodiment). That is, the rotor 321 of the fourth embodiment is a rotor with a so-called Lundell structure using the annular magnet 333 as a field magnet. The rotor 321 is configured such that the four first claw-shaped magnetic poles 331b to be the N-poles and the four second claw-shaped magnetic poles 332b to be the S-poles are alternately arranged in the peripheral direction. The number of poles of the rotor 321 is set to eight (the number of pole pairs is four).

The first back-surface auxiliary magnet 334 is arranged between a back surface 331c (surface inside in the radial direction) of each of the first claw-shaped magnetic poles 331b and an outer peripheral surface 332d of the second core base 332a. The back-surface auxiliary magnet 334 has a substantially fan-shaped section in the direction orthogonal to the axis L. The back-surface auxiliary magnet 334 is magnetized such that a portion in contact with the back surface 331c of the first claw-shaped magnetic pole 331b becomes the N-pole which is the same pole as the first claw-shaped magnetic pole 331b and a portion in contact with the outer peripheral surface 332d of the second core base 332a becomes the S-pole which is the same pole as its second core base 332a.

Moreover, the second back-surface auxiliary magnet 335 is arranged between a back surface 332c of each of the second claw-shaped magnetic poles 332b and an outer peripheral surface 331d of the first core base 331a. The back-surface auxiliary magnet 335 has a fan-shaped section in the direction orthogonal to the axis L and is magnetized such that a portion in contact with the back surface 332c becomes the S-pole and a portion in contact with the outer peripheral surface 331d of the first core base 331a becomes the N-pole. As the back-surface auxiliary magnets 334 and 335, a ferrite magnet, for example, can be used.

As illustrated in FIGS. 20 and 21, the inter-pole magnets 336 and 337 are arranged between the first claw-shaped magnetic pole 331b and the second claw-shaped magnetic pole 332b in the peripheral direction.

Moreover, as illustrated in FIG. 19, in the rotor 321, a sensor magnet 342 is provided through a substantially disc-shaped magnet fixing member 341. In more detail, the magnet fixing member 341 has a disc portion 341b in which a boss portion 341a is formed at a center and a cylinder portion 341c extending cylindrically from an outer edge of this disc portion 341b. To the magnet fixing member 341, the annular sensor magnet 342 is fixed so that it abuts against an inner peripheral surface of the cylinder portion 341c and a surface of the disc portion 341b. The magnet fixing member 341 is located at a position closer to the first rotor core 331, and the boss portion 341a is externally fitted with the rotating shaft 322 and fixed to the rotating shaft 322.

Then, in the end plate 314, a hall IC 343 as a magnetic sensor is provided at a position opposite in the axial direction to the sensor magnet 342. The hall IC 343 outputs an H-level detection signal and an L-level detection signal to the control circuit S when it senses magnetic fields of the N-pole and the S-pole of the sensor magnet 342, respectively.

Subsequently, the yoke housing 313 of the fourth embodiment will be described in detail. The yoke housing 313 has a substantially cylindrically-shaped cylindrical portion 351 and the bottom portion 352 located on an end portion of the cylindrical portion 351 and is constituted to form a substantially cylindrical shape with a bottom.

The bottom portion 352 has a stator opposing portion 353, a rotor opposing portion 354, and a bearing accommodating portion 355.

The stator opposing portion 353 is a portion located inside in the radial direction of the cylindrical portion 351. The stator opposing portion 353 continues from an axial end portion of the cylindrical portion 351 and is opposed in the axial direction to the stator 316. The stator opposing portion 353 has an opposing surface 353a opposed to the stator 316, a substantially annular groove portion 353b formed in the opposing surface 353a, and a surface 353c on a side opposite to the opposing surface 353a. The groove portion 353b is opened toward the stator 316 opposing in the axial direction. At this time, the surface 353c on the opposite side forms a planar state. That is, in the stator opposing portion 353, a thickness T1 at a spot in which the groove portion 353b is formed is smaller than a thickness T2 at a spot where the groove portion 353b is not formed. When the stator opposing portion 353 is cut in the axial direction, a sectional area of the spot in which the groove portion 353b is formed is different from the sectional area of the spot where the groove portion 353b is not formed. In more detail, a sectional area per unit length in the radial direction of the stator opposing portion 353 is different.

The rotor opposing portion 354 is a portion located inside in the radial direction from the stator opposing portion 353. The rotor opposing portion 354 is opposed in the axial direction to the rotor 321. Moreover, the rotor opposing portion 354 continues to an end portion inside in the radial direction of the stator opposing portion 353 through a cylindrical portion 357. Moreover, the cylindrical portion 357 extends toward an opening portion (end plate 314) of the cylindrical portion 351 from an end portion inside in the radial direction of the stator opposing portion 353. A tip end portion of the cylindrical portion 357 continues to an end portion outside in the radial direction of the rotor opposing portion 354. Thus, the rotor opposing portion 354 is located closer to the end plate 314 (opening portion of the yoke housing 313) in the axial direction than the stator opposing portion 353.

The rotor opposing portion 354 has an opposing surface 354a opposed to the rotor 321 and a surface 354c on the side opposite to the opposing surface 354a. In the opposing surface 354a, a substantially annular groove portion 354b is formed. The groove portion 354b is opened toward the rotor 321 opposed in the axial direction. At this time, the surface 354c on the opposite side forms a planar state. That is, in the rotor opposing portion 354, a thickness T3 at a spot in which the groove portion 354b is formed is smaller than a thickness T4 at a spot where the groove portion 354b is not formed. When the rotor opposing portion 354 is cut in the axial direction, a sectional area of the spot in which the groove portion 354b is formed is different from the sectional area of the spot where the groove portion 354b is not formed. In more detail, a sectional area per unit length in the radial direction of the rotor opposing portion 354 is different.

The bearing accommodating portion 355 is a portion located inside in the radial direction from the rotor opposing portion 354. The bearing accommodating portion 355 forms a cylindrical shape with a bottom so as to accommodate the bearing 323.

Subsequently, an action of the brushless motor 311 configured as above will be described.

When a three-phase driving current is supplied to the winding 320 from the control circuit S, a rotating magnetic field is generated in the stator 316, and the rotor 321 is rotated/driven. At this time, rotation of the sensor magnet 342 faced with the hall IC 343 causes a level of the detection signal outputted from the hall IC 343 to switch in accordance with a rotation angle (position) of the rotor 321, and the three-phase driving current switched at an optimal timing is supplied from the control circuit S to the winding 320 on the basis of the detection signal. As a result, the rotating magnetic field is favorably generated, and the rotor 321 is continuously rotated/driven favorably.

Here, the yoke housing 313 of a magnetic body (made of iron) is located on one end surface side in the axial direction of the rotor 321, and the end plate 314 made of a resin is located on the other end surface side in the axial direction of the rotor 321 and thus, a part of the magnetic flux from the annular magnet 333 of the rotor 321 leaks to the case 312 (yoke housing 313), and there is a concern that magnetic balance is lost.

Thus, in the fourth embodiment, the groove portions 353b and 354b are provided in the bottom portion 352 (the stator opposing portion 353 and the rotor opposing portion 354) of the yoke housing 313 that can be a magnetic path of the leakage flux so as to reduce the sectional area of the bottom portion 352. In this configuration, the bottom portion 352 is configured such that the leakage flux is magnetically saturated easily by increasing magnetic resistance of the bottom portion 352.

Subsequently, advantages of the fourth embodiment will be described.

(8) The bottom portion 352 of the yoke housing 313 is configured such that a part of the bottom portion 352 has a sectional area different from the sectional area of the other portion in a section along the axial direction. As a result, magnetic resistance increases in a portion where the sectional area is small. Thus, the leakage flux is suppressed, and the output characteristics can be improved.

(9) A part of the bottom portion 352 has the groove portions 353b and 354b. As a result, magnetic resistance increases in a portion where the sectional area is small. Thus, the leakage flux is suppressed, and the output characteristics can be improved.

(10) The groove portion 354b is formed at a portion (rotor opposing portion 354) through which the magnetic flux leaking from the rotor 321 having the annular magnet 333 generating a main magnetic flux to the bottom portion 352 of the yoke housing 313 and the magnetic flux leaking between the rotor 321 and the yoke housing 313 through the stator 316 both pass. Thus, the leakage flux can be reduced in advance at a spot where the leakage flux can concentrate easily.

(11) The groove portion 354b is opened toward the rotor 321. Thus, the bottom portion 352 of the yoke housing 313 is spaced away from the rotor 321 at least at the position where the groove portion 354b is formed. As a result, the magnetic flux leaking from the rotor 321 having the annular magnet 333 generating the magnetic flux to the bottom portion 352 of the yoke housing 313 can be reduced.

(12) The groove portions 353b and 354b are provided in the bottom portion 352 of the yoke housing 313 and formed annularly or preferably circularly. Thus, since the groove portions 353b and 354b are not interrupted in the peripheral direction, the leakage flux can be suppressed more reliably.

(13) The groove portion 353b is formed at the position outside in the radial direction from the position opposed in the axial direction to the rotor 321 in the bottom portion 352. As a result, the magnetic flux leaking to the bottom portion 352 through the cylindrical portion 351 of the yoke housing 313 can be suppressed by the groove portion 353b formed at the position outside in the radial direction from the position opposed in the axial direction to the rotor 321.

The fourth embodiment may be changed as follows.

In the fourth embodiment, the surfaces 353c and 354c on the side opposite to the opposing surfaces 353a and 354a on which the groove portions 353b and 354b are provided, respectively, do not have to have a planar shape.

Figure 23:
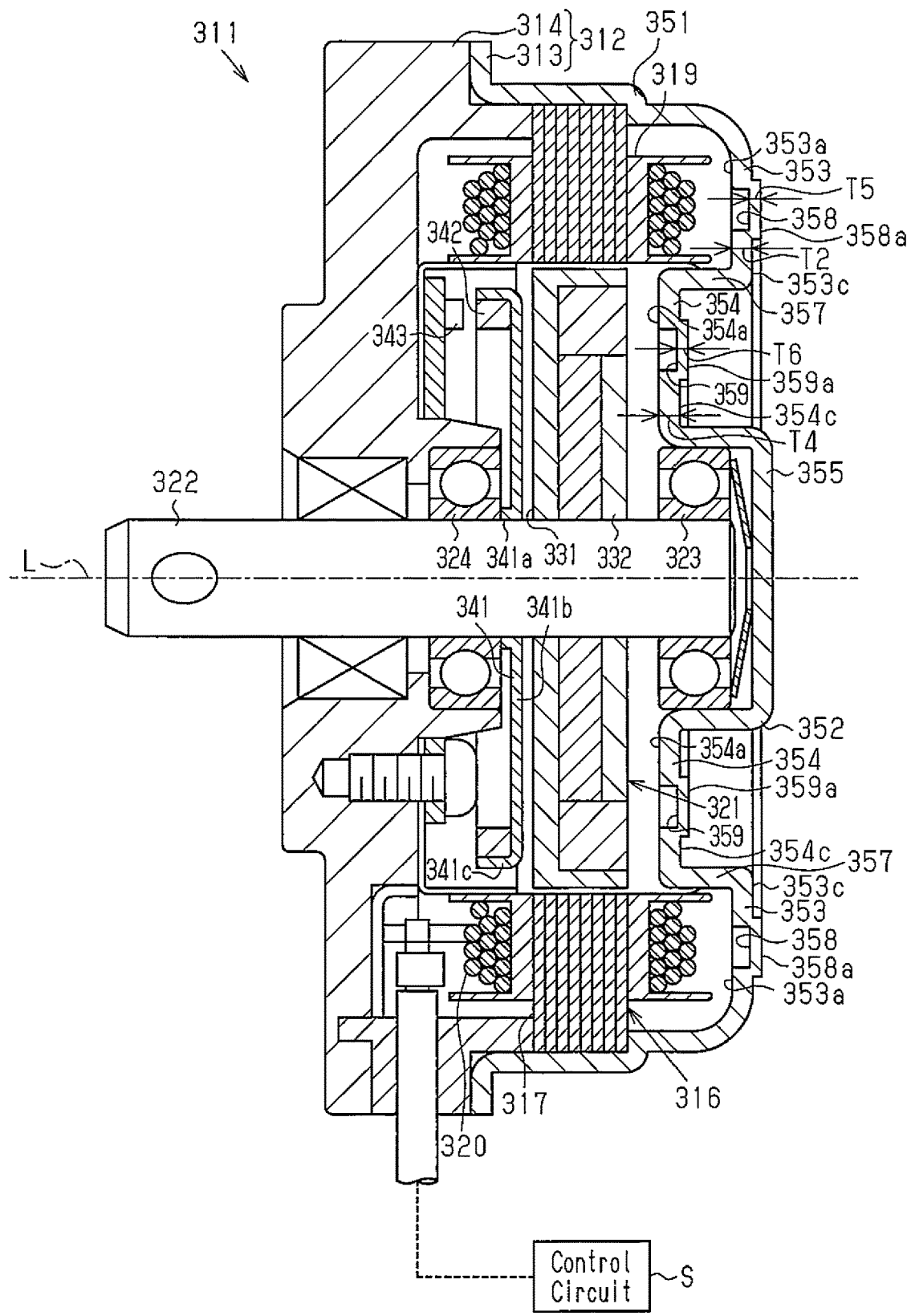
FIG. 23 is a sectional view of a brushless motor in another example of the fourth embodiment.

As illustrated in FIG. 23, groove portions 358 and 359 may be provided by half blanking. In this case, portions corresponding to the groove portions 358 and 359 in the surfaces 353c and 354c on the opposite side have projecting surfaces 358a and 359a extending in the axial direction more than the surfaces 353c and 354c. At this time, similarly to the fourth embodiment, in the stator opposing portion 353, a thickness T5 at a spot in which the groove portion 358 is formed is smaller than a thickness T2 at a spot where the groove portion 358 is not formed. When the stator opposing portion 353 is cut in the axial direction, a sectional area of the spot in which the groove portion 358 is formed is different from the sectional area of the spot where the groove portion 358 is not formed. In more detail, a sectional area per unit length in the radial direction of the stator opposing portion 353 is different. Similarly, in the rotor opposing portion 354, a thickness T6 at a spot in which the groove portion 359 is formed is smaller than a thickness T4 at a spot where the groove portion 359 is not formed. When the rotor opposing portion 354 is cut in the axial direction, a sectional area of the spot in which the groove portion 359 is formed is different from the sectional area of the spot where the groove portion 359 is not formed. In more detail, a sectional area per unit length in the radial direction of the rotor opposing portion 354 is different.

In the fourth embodiment, each of the groove portions 353b and 354b does not have to be opened toward the stator 316 and the rotor 321 opposing in the axial direction, respectively. For example, each of the groove portions 353b and 354b may be formed on the surfaces 353c and 354c on the side opposite to the opposing surfaces 353a and 354a. Moreover, the groove portions may be formed on both of the opposing surfaces 353a and 354a and the surfaces 353c and 354c on the opposite side so that a part of the bottom portion 352 has a sectional area different from the sectional area of the other portion in the section along the axial direction.

In the fourth embodiment, the groove portions 353b and 354b do not have to be provided on both of the stator opposing portion 353 and the rotor opposing portion 354. For example, the groove portion may be provided on either one of the stator opposing portion 353 and the rotor opposing portion 354.

Moreover, the groove portions 353b and 354b do not have to be provided one each on both of the stator opposing portion 353 and the rotor opposing portion 354. For example, a plurality of groove portions may be provided at least on either one of the stator opposing portion 353 and the rotor opposing portion 354.

In the fourth embodiment, the groove portions 353b and 354b provided on the stator opposing portion 353 and the rotor opposing portion 354 do not have to be circular. Moreover, the groove portions 353b and 354b do not have to be annular. In essential, it is only necessary that the groove portions 353b and 354b can partially reduce a portion that can be a magnetic path of the leakage flux by functioning so that the sizes of the sections become different.

In the fourth embodiment, the groove portions 353b and 354b do not have to be provided on the stator opposing portion 353 and the rotor opposing portion 354. For example, the groove portion may be provided in the cylindrical portion 357 between the stator opposing portion 353 and the rotor opposing portion 354.

The groove portion may be provided in the cylindrical portion 351 in addition to the bottom portion 352.

The above-described first to fourth embodiments and each of the above-described other examples may be combined as appropriate.

What is claimed is:

1. A motor comprising:
a stator having a stator core and a winding;
a rotor having a first rotor core made of metal, a second rotor core made of metal, and a field magnet, each of the first and second rotor cores having a plurality of claw-shaped magnetic poles arranged in a peripheral direction, the field magnet being sandwiched between the first rotor core and the second rotor core in an axial direction, and the field magnet being configured so as to cause the claw-shaped magnetic pole of the first rotor core and the claw-shaped magnetic pole of the second rotor core to function as magnetic poles different from each other in the sandwiched state; and
a cylindrical case with a bottom, the case having a yoke housing which is a magnetic body and a lid portion closing an opening portion of the yoke housing, and the yoke housing accommodating the stator and the rotor, wherein
in the axial direction, the first rotor core is located closer to the lid portion than the second rotor core, and the second rotor core is located closer to a bottom portion of the yoke housing than the first rotor core; and
the second rotor core is configured so as to be magnetically saturated less easily than the first rotor core.

2. The motor according to claim 1, wherein
the core base of the first rotor core is arranged closer to the yoke housing in the axial direction than the core base of the second rotor core; and
the first back-surface magnet portion is thicker in a radial direction than the second back-surface magnet portion.

3. The motor according to claim 1, wherein
saturation magnetic flux density of the second rotor core is set higher than the saturation magnetic flux density of the first rotor core.

4. The motor according to claim 3, wherein
the second rotor core is made of a material with a carbon content lower than that of the first rotor core.

5. The motor according to claim 3, wherein
the second rotor core contains a material subjected to annealing.

6. The motor according to claim 1, wherein
a thickness in the axial direction of the second rotor core is set larger than the thickness in the axial direction of the first rotor core.

7. The motor according to claim 1, wherein
the first rotor core is formed of a cold rolled steel plate; and
the second rotor core is formed of a hot rolled steel plate.

* * * * *